(12) United States Patent
Stapelbroek

(10) Patent No.: US 12,306,286 B2
(45) Date of Patent: May 20, 2025

(54) INFORMATION PROCESSING APPARATUS AND SENSING METHOD

(71) Applicant: Asahi Kasei Microdevices Corporation, Tokyo (JP)

(72) Inventor: Willem Johan Stapelbroek, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 414 days.

(21) Appl. No.: 17/752,827

(22) Filed: May 24, 2022

(65) Prior Publication Data

US 2022/0404482 A1     Dec. 22, 2022

(30) Foreign Application Priority Data

Jun. 16, 2021 (JP) ................................ 2021-100328
Apr. 8, 2022 (JP) ................................ 2022-064351

(51) Int. Cl.
    *G01S 13/28*     (2006.01)
    *G01S 7/288*     (2006.01)
    *G01S 13/524*     (2006.01)

(52) U.S. Cl.
    CPC .......... *G01S 13/282* (2013.01); *G01S 7/2883* (2021.05); *G01S 13/5246* (2013.01)

(58) Field of Classification Search
CPC combination set(s) only.
See application file for complete search history.

(56) References Cited

U.S. PATENT DOCUMENTS

| | | | |
|---|---|---|---|
| 2014/0058255 A1 | 2/2014 | Mase | |
| 2017/0254891 A1 | 9/2017 | Malinovskiy | |
| 2018/0011170 A1 | 1/2018 | Rao | |
| 2019/0391249 A1* | 12/2019 | Takeuchi | G01S 13/536 |
| 2022/0260702 A1 | 8/2022 | Vaishnav | |

FOREIGN PATENT DOCUMENTS

| | | |
|---|---|---|
| JP | 2003315447 A | 11/2003 |
| JP | 2019174130 A | 10/2019 |
| JP | 2021001735 A | 1/2021 |
| JP | 2021063633 A | 4/2021 |
| JP | 2022192005 A | 12/2022 |
| JP | 2023026124 A | 2/2023 |

\* cited by examiner

*Primary Examiner* — Vladimir Magloire
*Assistant Examiner* — Eric K Hodac

(57) ABSTRACT

Provided is an information processing apparatus configured to sense an object by using an FMCW radar. The information processing apparatus includes: a data processing unit configured to process a reception signal and generate a power spectrum signal with a predetermined number of bins; an acquisition unit configured to acquire a plurality of peak bins corresponding to the object on the basis of the power spectrum signal; an extraction unit configured to extract an output signal corresponding to the power spectrum signal; and a correction unit configured to correct a phase of the output signal according to bin numbers of the plurality of peak bins. The data processing unit may apply a higher-order window function than a rectangular window to the reception signal. The correction unit may correct the phase of the output signal.

20 Claims, 26 Drawing Sheets

INFORMATION PROCESSING APPARATUS AND SENSING METHOD

BACKGROUND

1. Technical Field

The present invention relates to an information processing apparatus and a sensing method.

2. Related Art

Conventionally, an information processing apparatus is known which senses an object by using a Doppler radar (see, for example, Patent Document 1).
Patent Document 1: Japanese Patent No. 6029108

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the invention according to the claims. In addition, all the combinations of the features described in the embodiments are not necessarily essential to means provided by aspects of the invention.

Figure 1A:
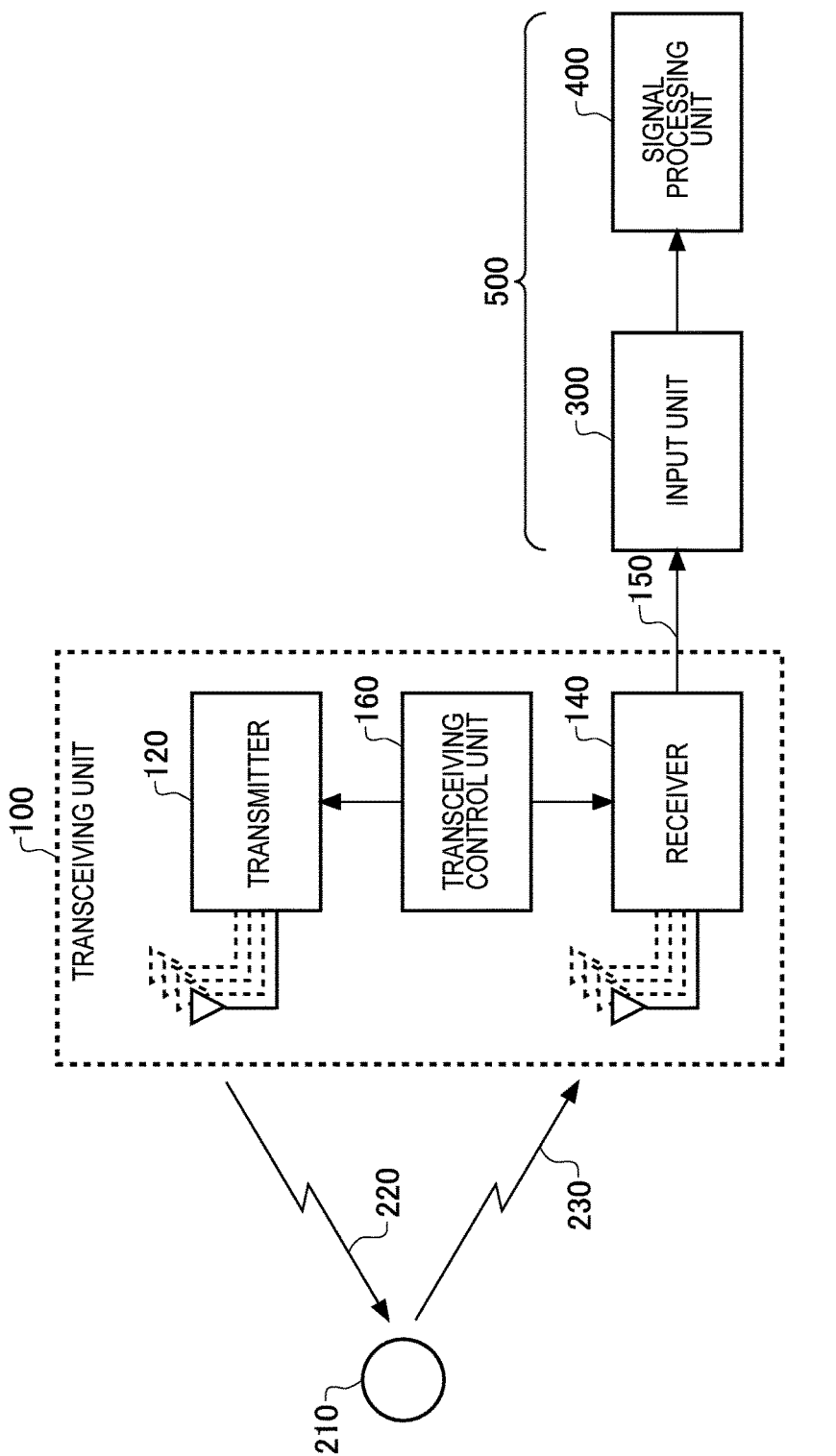
FIG. 1A illustrates a summary of a configuration of a system 600.

FIG. 1A illustrates a summary of a configuration of a system 600. The system 600 includes a transceiving unit 100 and an information processing apparatus 500. The transceiving unit 100 includes a transmitter 120 and a receiver 140.

The transmitter 120 transmits a frequency modulated continuous wave radar (FMCW radar) as a transmission wave 220 to an object 210. The FMCW radar is a continuous wave radar in which a frequency is modulated. For example, the FMCW radar has a burst wave including a plurality of chirps. In each chirp, the frequency is swept in time. The transmitter 120 may include a plurality of transmission antennas.

The receiver 140 receives the reflected wave of the FMCW radar reflected by the object 210. The receiver 140 of the present example demodulates a reception wave 230 to generate an analog beat signal 150. The receiver 140 may include a plurality of reception antennas. By providing the plurality of reception antennas, it is possible to acquire information regarding an angle θ of the object 210 viewed from the transceiving unit 100.

The beat signal 150 is an example of an IF signal down-converted to an intermediate frequency (IF) frequency proportional to a Time of Flight (TOF) of the reflected wave. The TOF is a time until the transmitted transmission wave 220 is received as a reflected wave, and increases when a distance R between the information processing apparatus 500 and the object 210 increases. Since the frequency of the beat signal 150 is proportional to the TOF, the frequency also changes in proportion to the distance R.

A transceiving control unit 160 controls transmission and reception of signals by the transmitter 120 and the receiver 140. In an example, the transceiving control unit 160 controls a modulation width and a cycle of the frequency of the chirp of the transmission wave 220.

The information processing apparatus 500 performs AD conversion on the beat signal 150 and performs signal processing to calculate the distance R and a velocity V of the object 210. The information processing apparatus 500 of the present example can sense minute vibration in units of several mm by calculating the distance R with phases. The information processing apparatus 500 includes an input unit 300 and a signal processing unit 400.

The input unit 300 converts the analog beat signal 150 input from the receiver 140 into a digital reception signal. The input unit 300 may be an ADC configured by an integrated circuit such as an RFIC.

The signal processing unit 400 is a digital signal processor (DSP) which executes signal processing such as a FFT on the basis of the digital reception signal output from the input unit 300. The signal processing unit 400 senses the object 210 by processing the digital reception signal. In the present specification, the sensing of the object 210 refers to detecting the presence of the object 210 by acquiring the distance R, the velocity V, the angle θ, and the like of the object 210. Note that the distance R, the velocity V, and the angle θ of the object 210 will be described below.

The signal processing unit 400 senses the object 210 on the basis of the minute vibration data of the object 210. In the present specification, the sensing of the object 210 refers to acquiring a biological signal such as minute vibration data of the object 210. The biological signal exists when the object 210 is a living body, and is generated by breathing, heartbeat, or the like.

The minute vibration data is data based on the heartbeat and breathing of the object 210. In an example, the information processing apparatus 500 can obtain, as the minute vibration data, a resolution with the wavelength of the FMCW radar maximized. For example, the information processing apparatus 500 can obtain a resolution 100 to 1000 times that of one wavelength in a millimeter wave band (a frequency band of about 30 to 300 GHz) used in the FMCW radar.

The system 600 senses the object 210 by transmitting the FMCW radar to the object 210. By performing appropriately signal processing on the reception signal based on the modulated frequency of the FMCW radar, the system 600 can sense the object 210 even when a relative velocity between the system 600 and the object 210 is zero.

Figure 1B:
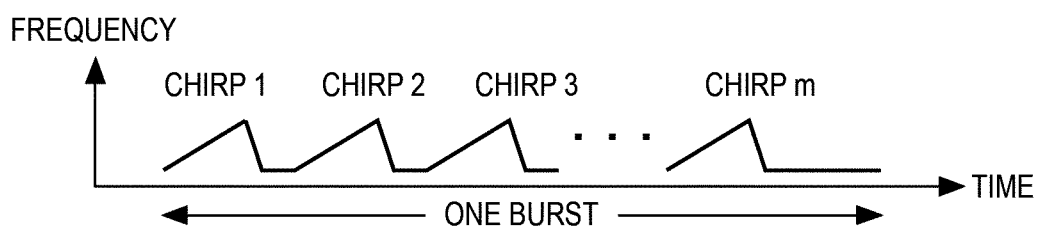
FIG. 1B illustrates an example of a transmission wave 220 transmitted by transmitter 120.

FIG. 1B illustrates an example of the transmission wave 220 transmitted by the transmitter 120. The transmission wave 220 includes m chirps in one burst. m is an integer of two or more. The transceiving unit 100 modulates the frequency of the chirp and analyzes a difference between the transmission wave 220 and the reception wave 230 to calculate the distance R, the velocity V, and the angle θ of the object 210. The transceiving unit 100 may appropriately adjust the modulation width or the cycle of the frequency of the chirp according to the position of the object 210 or the like. The transmission wave 220 of the present example includes m chirps of the same waveform, but may include chirps of different waveforms.

The FMCW radar is a radar for sensing a distance to a target and a relative velocity by using a time difference in which an echo is returned from the object 210. For example, the FMCW radar linearly raises or lowers a frequency in a cycle of about several microseconds to several hundred microseconds and uses only one of raising and lowering for sensing. However, in a FMCW method, both raising and lowering may be used for sensing.

The FMCW radar can simultaneously sense angle information by arranging a plurality of channels. For example, the FMCW radar achieves long distance sensing in a 76G band (76 to 77 GHz), and achieves middle distance sensing or short distance sensing in a 79G band (77 to 81 GHz). Note that the FMCW radar may be a system in which the frequency is linearly raised and lowered in a cycle of about several milliseconds to several hundred milliseconds.

Figure 1C:
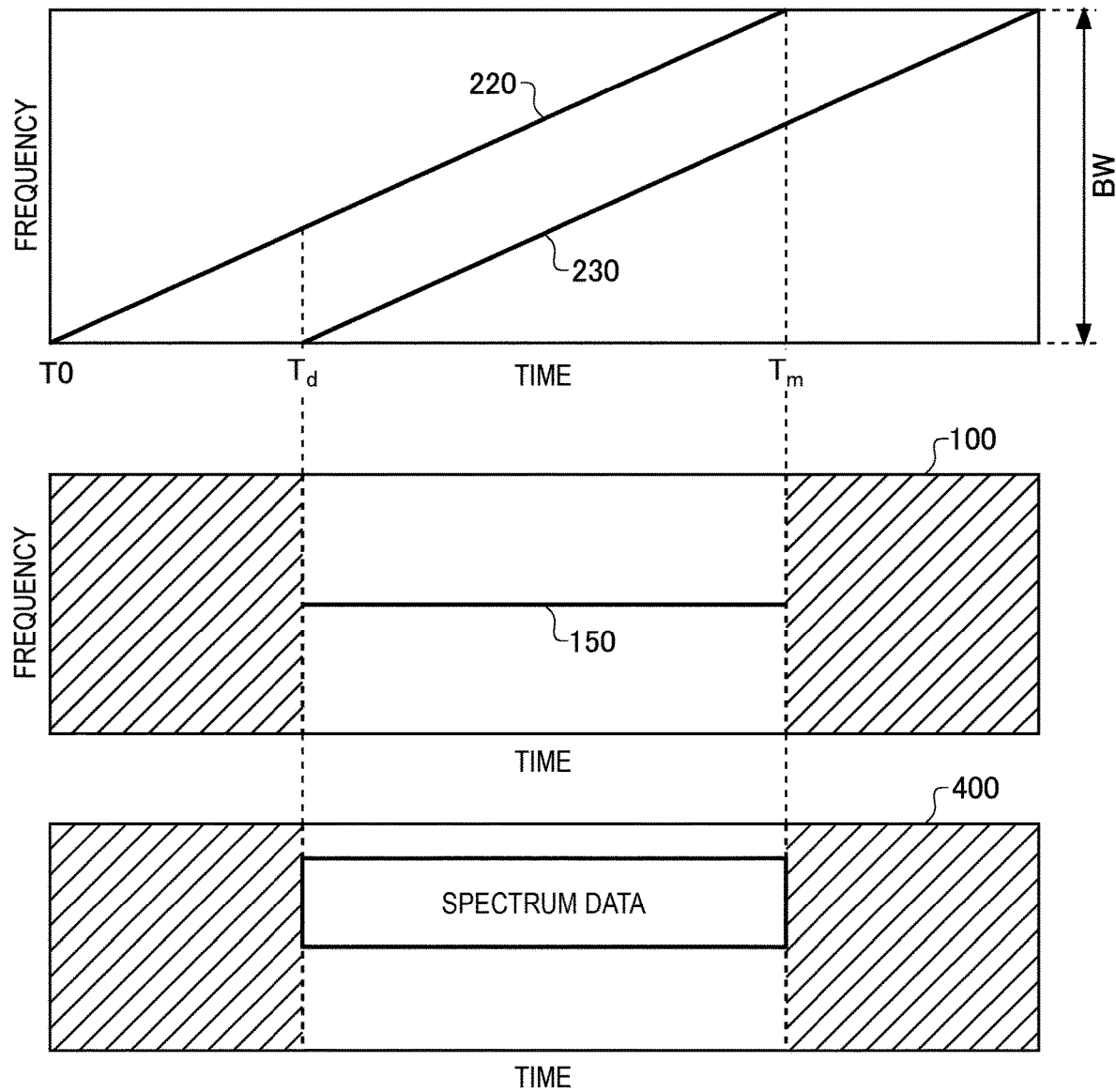
FIG. 1C is a diagram for explaining an example of signal processing by an information processing apparatus 500.

FIG. 1C is a diagram for explaining an example of signal processing by the information processing apparatus 500.

The frequency of the chirp of the transmission wave 220 linearly increases from a low frequency in a period from a time T0 to a time Tm. The reception wave 230 is received after a delay time Td according to the distance R to the object 210. The delay time Td changes according to the distance R to the object 210.

The beat signal 150 is generated in the transceiving unit 100. The beat signal 150 is generated from a difference between the chirp of the transmission wave 220 and the chirp of the reception wave 230. The frequency of the beat signal 150 is proportional to the magnitude of the delay time Td.

The signal processing unit 400 calculates spectrum data by using a signal between the time Td and the time Tm when the frequency of the beat signal 150 is relatively stable. A specific calculation method of the spectrum data will be described below.

Figure 1D:
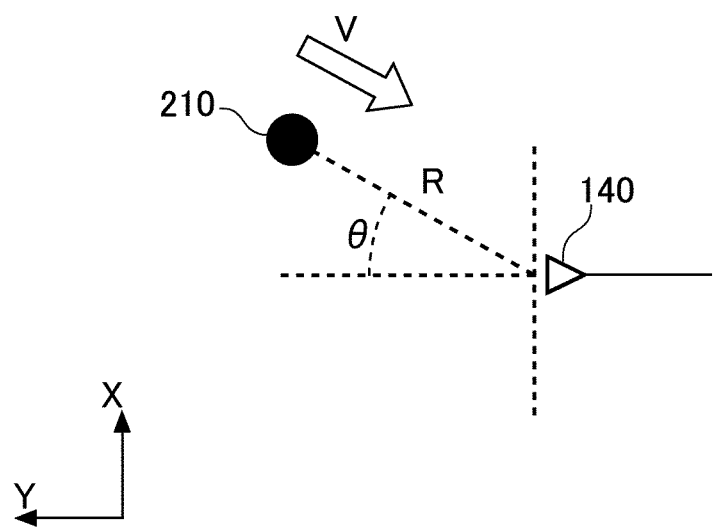
FIG. 1D is a diagram for explaining a distance R, a velocity V, and an angle θ of an object 210.

FIG. 1D is a diagram for explaining the distance R, the velocity V, and the angle θ of the object 210. In the present example, for the sake of simplicity, the transmitter 120 and the receiver 140 are considered as the same position.

The object 210 fluctuates at the velocity V at a position of the distance R from the transceiving unit 100. The velocity V is a relative velocity between the transceiving unit 100 and the object 210. The angle θ is an angle of the object 210 viewed from the transceiving unit 100. Specifically, when a direction in which the receivers 140 are arranged is defined as an X-axis direction and a direction in which the FMCW radar is emitted is defined as a Y axis, the angle θ is an angle formed by the Y axis and the position of the object 210 on an XY plane.

Figure 1E:
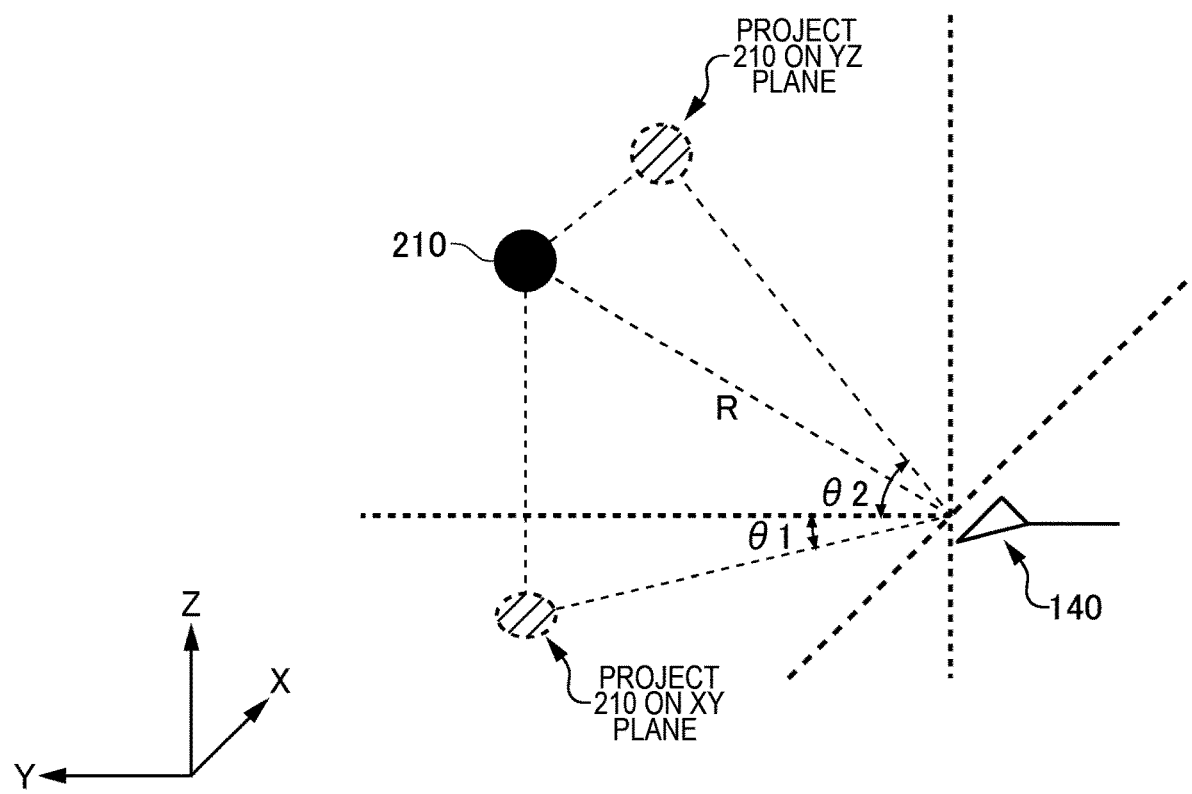
FIG. 1E is a diagram for explaining the distance R, the velocity V, an angle θ1, and an angle θ2 of the object 210.

FIG. 1E is a diagram for explaining the distance R, the velocity V, the angle θ1, and an angle θ2 of the object 210. The information processing apparatus 500 can sense the object 210 on a similar principle even by a so-called 3D radar for sensing a new axis (Z axis) perpendicular to the XY plane. In this case, the information processing apparatus 500 acquires three-dimensional information by using the angle θ2 at which the object 210 is projected on the YZ plane in addition to the angle θ1 at which is projected on the XY plane. Note that in the present specification, when simply referred to as the angle θ, the angle θ may be read as including both the angle θ1 and the angle θ2.

Figure 2:
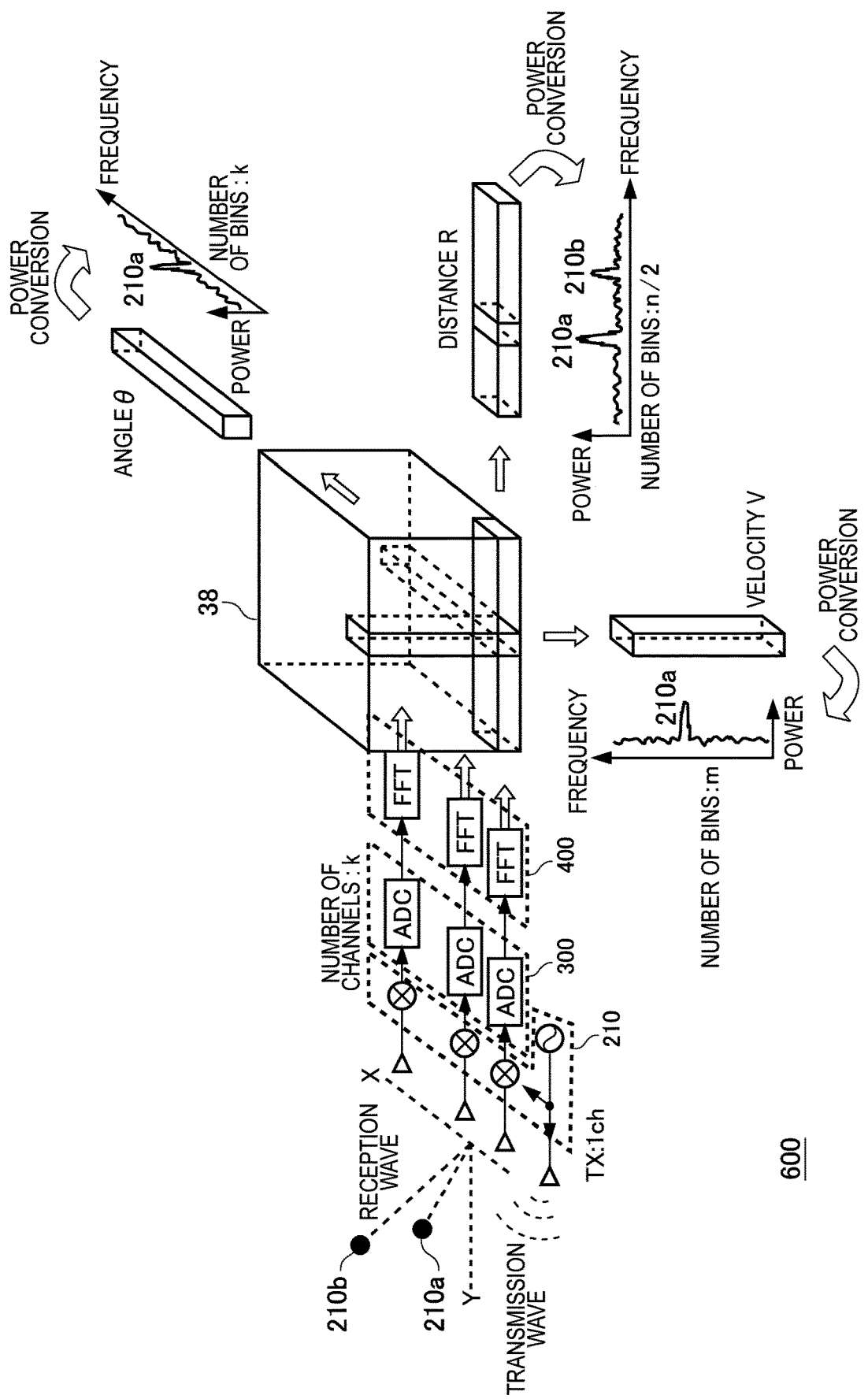
FIG. 2 is a diagram for explaining an operating principle of the system 600.

FIG. 2 is a diagram for explaining an operating principle of the system 600. The system 600 acquires information regarding each of the distance R, the velocity V, and the angle θ of the object 210 by using a data cube 38.

The transceiving unit 100 includes a plurality of channels. In an example, the transceiving unit 100 includes one transmission antenna and k reception antennas. k is an integer of one or more. The transceiving unit 100 can detect the angle θ by having the plurality of channels. Reflected signals from an object 210a and an object 210b are input to each of the k reception antennas.

The data cube 38 includes data strings for the distance R, the velocity V, and the angle θ, respectively. The data cube 38 includes each of a distance data string obtained by a distance FFT, a velocity data string obtained by a velocity FFT, and an angle data string obtained by an angle FFT.

By power-converting the distance data string, a distance power spectrum having a number of bins of n/2 is obtained. The distance power spectrum includes two peak bins corresponding to the distances to the object 210a and the object 210b.

By executing the velocity FFT on the data string corresponding to the peak bin position of the distance power spectrum and power-converting the newly obtained velocity data string, a velocity power spectrum in which the number of bins is m is obtained. The velocity power spectrum includes a peak bin corresponding to the velocity of the object 210a or the object 210b. Which living body velocity the peak bin corresponds depends on the peak bin position of the selected distance power spectrum.

By executing the angle FFT on the data string corresponding to the peak bin position of the distance power spectrum and power-converting the newly obtained angle data string, an angle power spectrum in which the number of bins is k is obtained. The angle power spectrum includes a peak bin corresponding to the angle of the object 210a or the object 210b. Which living body corresponds for the angle depends on the peak bin position of the selected distance power spectrum.

The information processing apparatus 500 calculates phase information obtained by phase-converting the distance data string of the object 210 obtained by the distance FFT in time series, and acquires biological signal data of the object 210. Note that the bin position of the phase information used as the biological signal information corresponds to the peak bin position of the distance power spectrum. The biological signal data is an example of an output signal of the information processing apparatus 500.

Figure 3A:
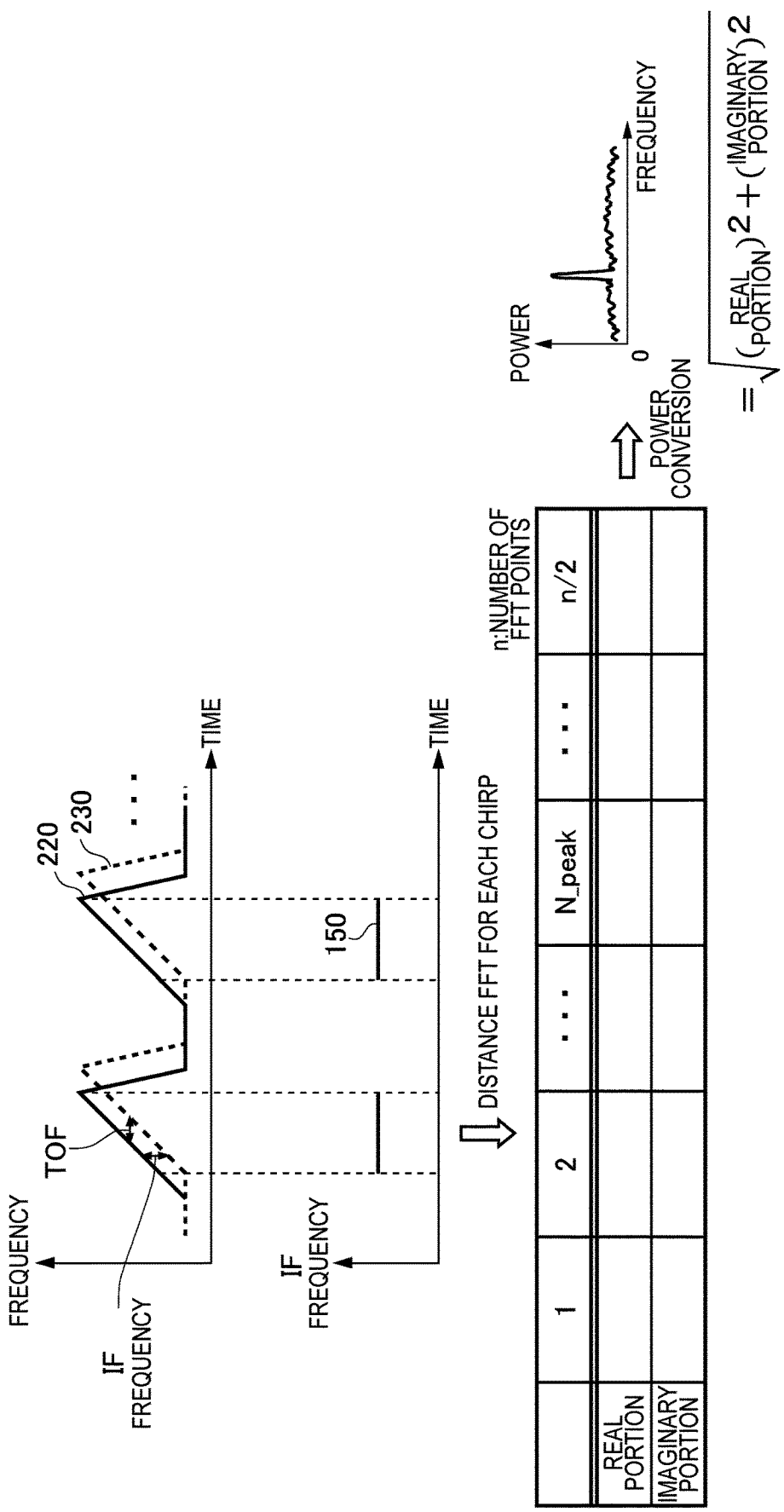
FIG. 3A is a diagram for explaining a principle of sensing the distance R to the object 210.

FIG. 3A is a diagram for explaining a principle of sensing the distance R to the object 210. The distance R to the object 210 is calculated by the distance FFT of at least one chirp. A solid line of the graph indicates the transmission wave 220, and a broken line indicates the reception wave 230. A vertical axis represents a frequency, and a horizontal axis represents time.

The IF frequency is the frequency of the beat signal 150 obtained by mixing the transmission wave 220 and the reception wave 230 of the FMCW radar. The IF frequency increases when the distance R between the information processing apparatus 500 and the object 210 increases. The information processing apparatus 500 can obtain the IF frequency proportional to the distance R to the object 210 for a certain period. That is, the information processing apparatus 500 can acquire the distance R to the object 210 by analyzing the IF frequency.

The information processing apparatus 500 executes the distance FFT processing for each chirp. For example, when the number of FFT points is n, each of the data strings of a real portion and an imaginary portion is obtained in n/2 points, and the number of bins is n/2. The information processing apparatus 500 calculates a peak bin by performing power conversion on the basis of the result of the distance FFT. The information processing apparatus 500 can calculate the distance R to the object 210 on the basis of the frequency at which the peak appears.

Figure 3B:
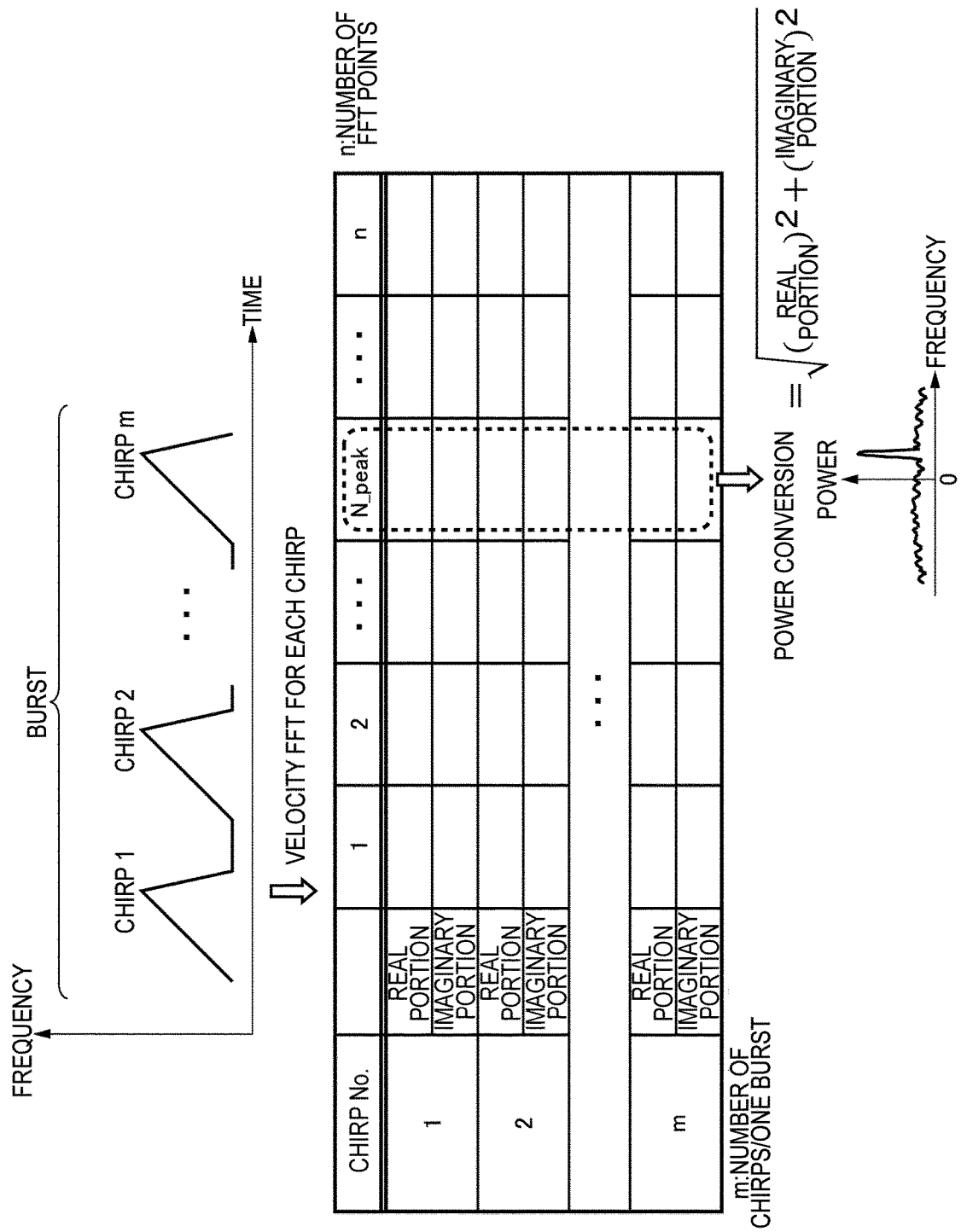
FIG. 3B is a diagram for explaining a principle of sensing the velocity V of the object 210.

FIG. 3B is a diagram for explaining a principle of sensing the velocity V of the object 210. The velocity FFT is executed on each data string obtained by the distance FFT for multiple times of chirps in the burst and a new data string corresponding to the peak bin position of the distance power spectrum. One burst includes m chirps. The velocity V of the object 210 is calculated by performing the power conversion on the basis of the result of the velocity FFT.

The information processing apparatus 500 executes the velocity FFT processing in one burst. For example, when the number of chirps in one burst is m, each of the data strings of the real portion and the imaginary portion is obtained with m points, and the number of bins is m. The information processing apparatus 500 calculates the peak bin position by performing the power conversion on the basis of the result of the velocity FFT. The information processing apparatus 500 can calculate the velocity V from the frequency of the peak bin of the velocity FFT.

Figure 3C:
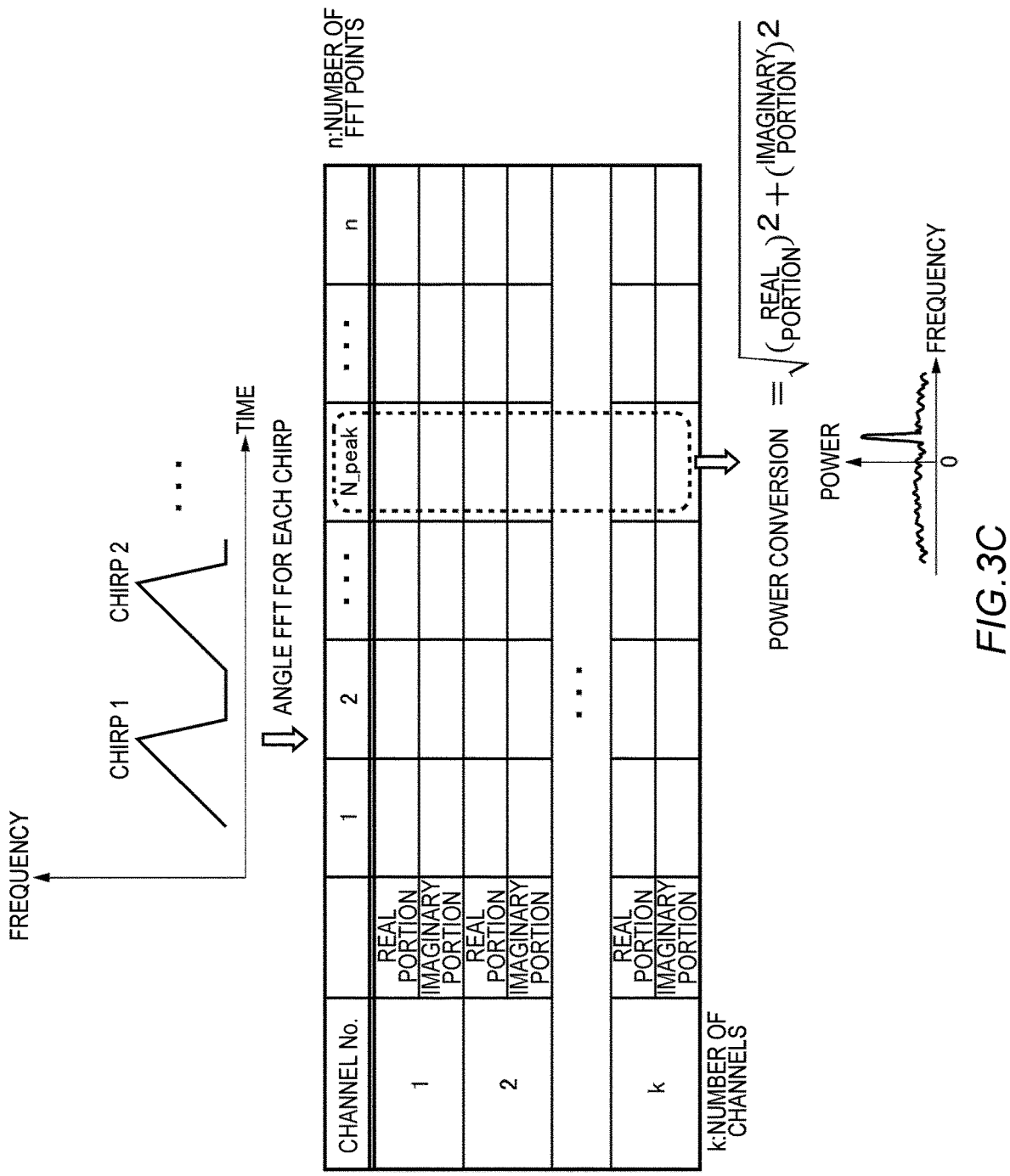
FIG. 3C is a diagram for explaining a principle of sensing the angle θ of the object 210.

FIG. 3C is a diagram for explaining a principle of sensing the angle θ of the object 210. In the angle θ, the angle FFT is executed on each data string of each channel obtained by the distance FFT for the chirp and a new data string corresponding to the peak bin position of the distance power spectrum. One time of chirp includes k chirps corresponding to k channels.

The information processing apparatus 500 executes the angle FFT processing for the k channels. For example, in the case of the k channel, each of the data strings of the real portion and the imaginary portion is obtained with k points, and the number of bins is k. The information processing apparatus 500 receives the reception waves 230 by the receivers 140 of the k channels arranged in the X-axis direction. Since a phase difference corresponding to the angle θ of the object 210 occurs in the reception waves 230 received by respective receivers 140, the information processing apparatus 500 can calculate the angle θ of the object 210 by analyzing the reception signals of the k channels.

Figure 4A:
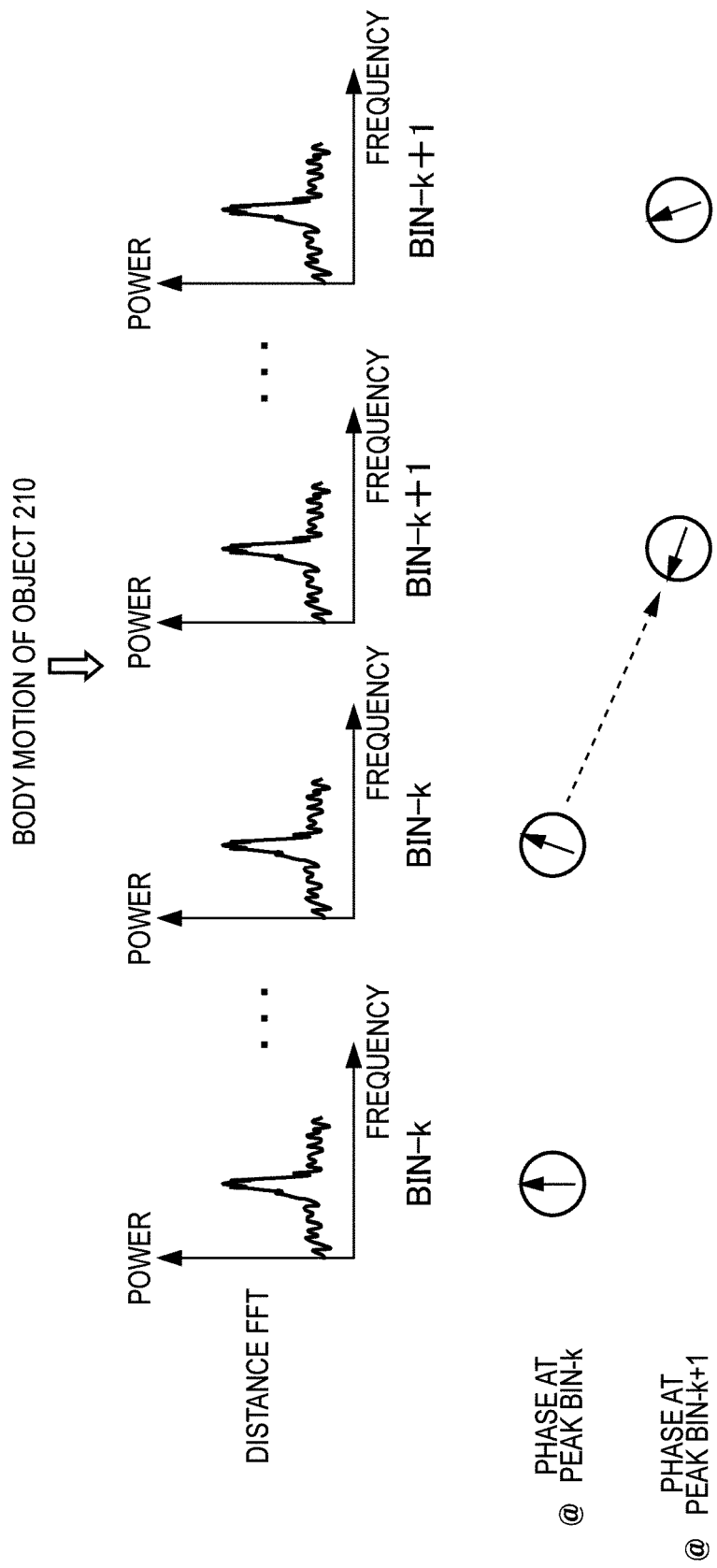
FIG. 4A is a diagram for explaining a method of sensing the object 210 with a body motion.

FIG. 4A is a diagram for explaining a method of sensing the object 210 with a body motion. The body motion of the object 210 is a larger motion as compared with a biological signal such as a heartbeat. When there is the body motion of the object 210, the position of the peak bin of the distance power spectrum may move. When the object 210 does not exist in the same bin and the bin is changed, a phase discontinuity (that is, a phase shift) may occur.

As a basic principle of biological sensing by the FMCW radar, the information processing apparatus 500 can obtain accurate distance information of the object 210 by tracking the peak bin of the distance FFT for the object 210. On the other hand, even when the peak bin is changed, if only the same bin is tracked, the accuracy of the obtained phase information may be deteriorated as compared with the peak bin. The information processing apparatus 500 of the present example can suppress such deterioration in the accuracy of the phase information by compensating for the phase shift.

Figure 4B:
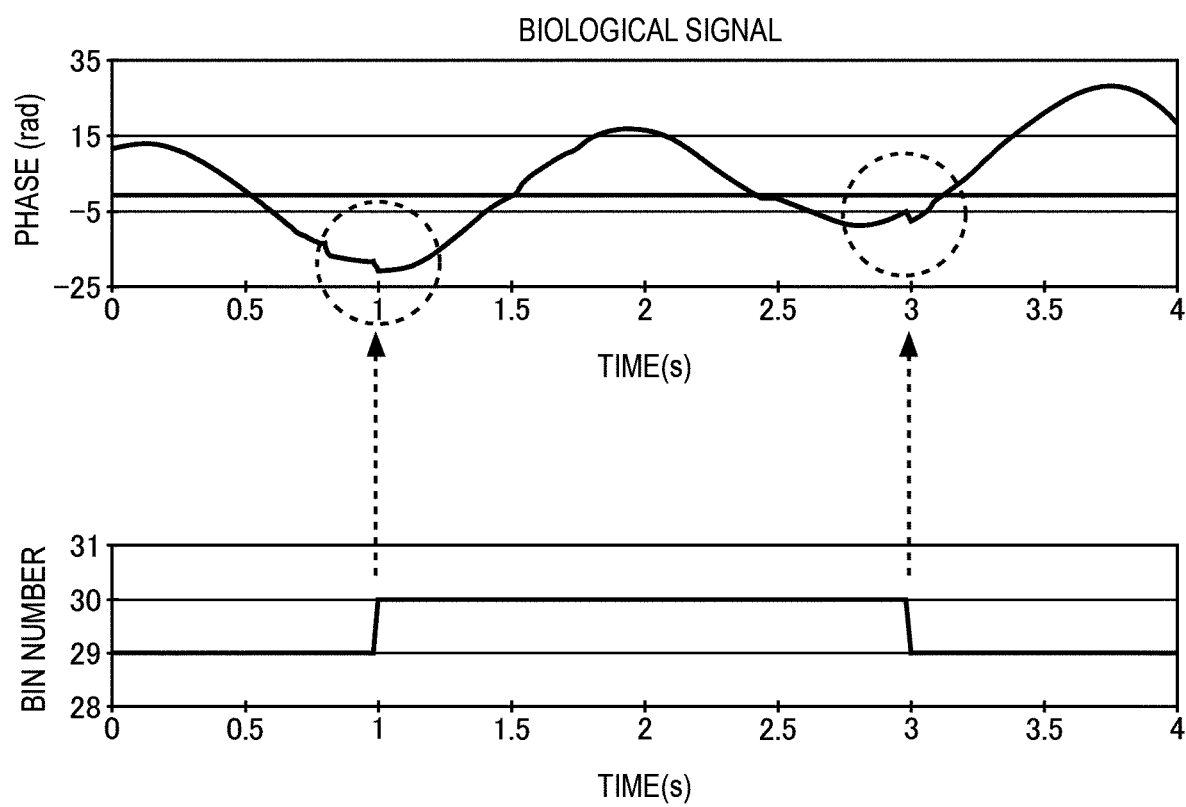
FIG. 4B illustrates an example of an influence of the body motion of the object 210.

FIG. 4B illustrates an example of the influence of the body motion of the object 210. In order to extract such a body motion, phases are acquired at a large number of points of the chirp. However, when the peak bin for acquiring a phase value changes, a phase signal becomes discontinuous, and a phase shift of approximately π[rad] may occur. In the present example, in a period from one second to three seconds, the bin number of the peak bin is shifted from 29 to 30, and a phase shift occurs.

Figure 5A:
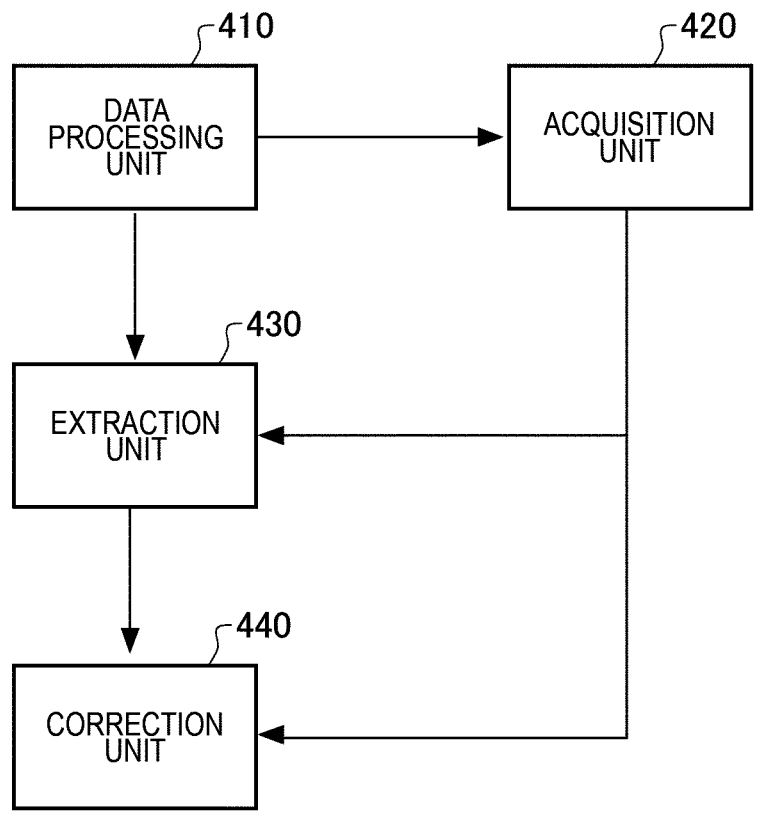
FIG. 5A illustrates an example of a configuration of a signal processing unit 400.

FIG. 5A illustrates an example of the configuration of the signal processing unit 400. The signal processing unit 400 includes a data processing unit 410, an acquisition unit 420, an extraction unit 430, and a correction unit 440.

The data processing unit 410 processes the reception signal based on the reception wave 230 and acquires a power spectrum signal of a predetermined number of bins. The data processing unit 410 of the present example executes at least one of the distance FFT, the velocity FFT, or the angle FFT to generate the power spectrum signal. Note that the data processing unit 410 may process the reception signal by using another algorithm such as a CAPON method or compressive sensing.

The acquisition unit 420 acquires a peak bin corresponding to the object 210 on the basis of the power spectrum signal output from the data processing unit 410. When the bin number of the peak bin to which the object 210 belongs is changed, the acquisition unit 420 may change the peak bin to be acquired.

The extraction unit 430 extracts a predetermined output signal from the power spectrum signal. The extraction unit 430 of the present example extracts IQ data including an in-phase component and a quadrature component orthogonal to the in-phase component on the basis of the peak bin acquired by the acquisition unit 420.

The correction unit 440 executes a phase correction algorithm on the basis of the IQ data extracted by the extraction unit 430 and the detection result of the acquisition unit 420. The correction unit 440 corrects the phase of the output signal according to the bin numbers of the plurality of peak bins. As a result, the correction unit 440 can suppress the influence of the phase shift which occurs when the bin number to which the object 210 belongs is changed according to a temporal change. A specific operation of the correction unit 440 will be described below.

Figure 5B:
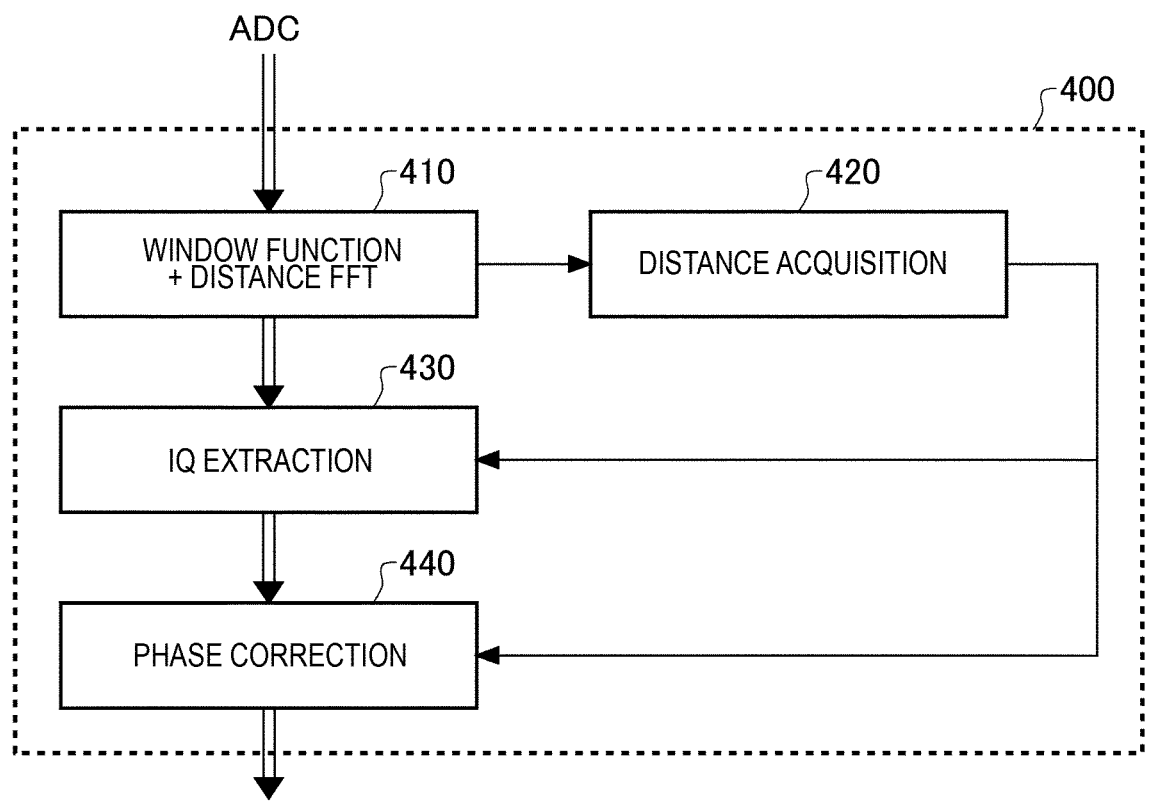
FIG. 5B illustrates an example of an operation of the signal processing unit 400.

FIG. 5B illustrates an example of the operation of the signal processing unit 400. The signal processing unit 400 receives a digital reception signal AD-converted by the input unit 300.

The data processing unit 410 executes distance FFT processing and window function processing. The data processing unit 410 acquires a distance power spectrum by executing the distance FFT on the reception signal. The data processing unit 410 outputs the generated distance power spectrum to the acquisition unit 420.

The acquisition unit 420 acquires a peak bin indicating the distance R to the object 210 on the basis of the power spectrum signal. The acquisition unit 420 may acquire a peak position by a simple peak detection algorithm, or may acquire the peak position by using another algorithm such as a CFAR algorithm. The acquisition unit 420 outputs the acquired information regarding the distance R to the object 210 to the extraction unit 430 and the correction unit 440.

The extraction unit 430 acquires IQ data corresponding to the peak bin acquired by the acquisition unit 420 from the result of the distance FFT by the data processing unit 410. The extraction unit 430 may directly extract IQ data from the power spectrum signal, or may use another algorithm such as compressive sensing. The extraction unit 430 outputs the extraction result of the IQ data to the correction unit 440.

The correction unit 440 corrects the phase of the output signal of the data processing unit 410. The correction unit 440 of the present example corrects the phase of the output signal on the basis of the distance acquisition result after the distance FFT. For example, the correction unit 440 corrects the phase of the peak bin of the distance power spectrum according to the bin number of the peak bin acquired by the distance FFT.

Figure 5C:
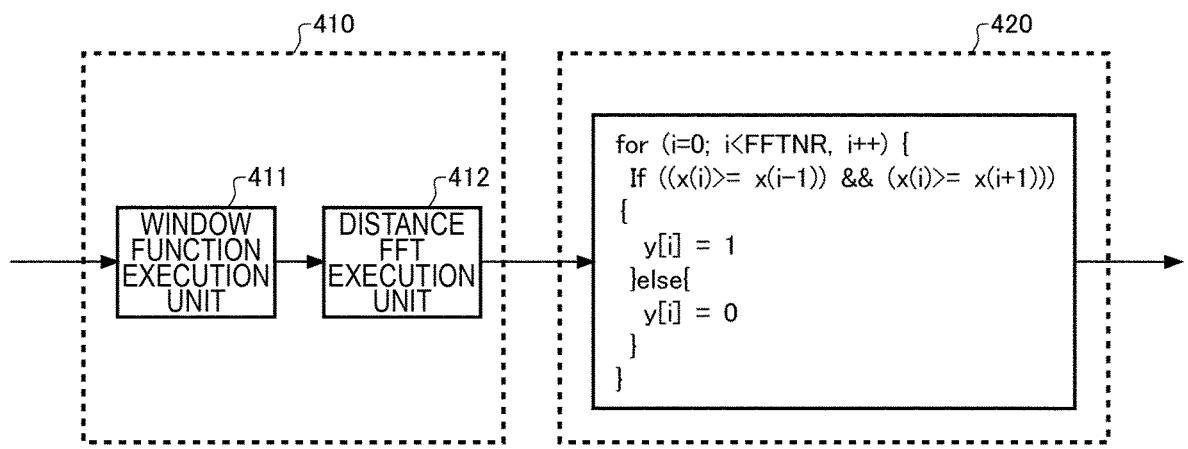
FIG. 5C is a diagram for explaining a more detailed configuration of a data processing unit 410 and an acquisition unit 420.

FIG. 5C is a diagram for explaining a more detailed configuration of the data processing unit 410 and the acquisition unit 420. The data processing unit 410 includes a window function execution unit 411 and a distance FFT execution unit 412.

The window function execution unit 411 causes a predetermined window function to act on the digital reception signal. The window function execution unit 411 may use any window function such as a rectangular window, a Hann window, a Hamming window, or a Blackman window. The window function execution unit 411 may cut out the reception signal by using a higher-order window function than the rectangular window. The Hann window, the Hamming window, and the Blackman windows are examples of a higher-order window function than the rectangular window.

In the present example, after the window function execution unit 411 cuts out the digital reception signal, the distance FFT execution unit 412 executes the distance FFT to convert the digital reception signal into a distance power spectrum in a frequency domain. However, the order of the FFT processing and the window function processing is not limited thereto. The window function execution unit 411 may cut out the signal after the distance FFT execution unit 412 performs the conversion into the distance power spectrum in the frequency domain by the distance FFT.

The acquisition unit 420 has a predetermined peak detection algorithm. The acquisition unit 420 of the present example has a simple detection algorithm for local peak search. Note that the acquisition unit 420 may use another more complicated detection algorithm such as CFAR.

Figure 5D:
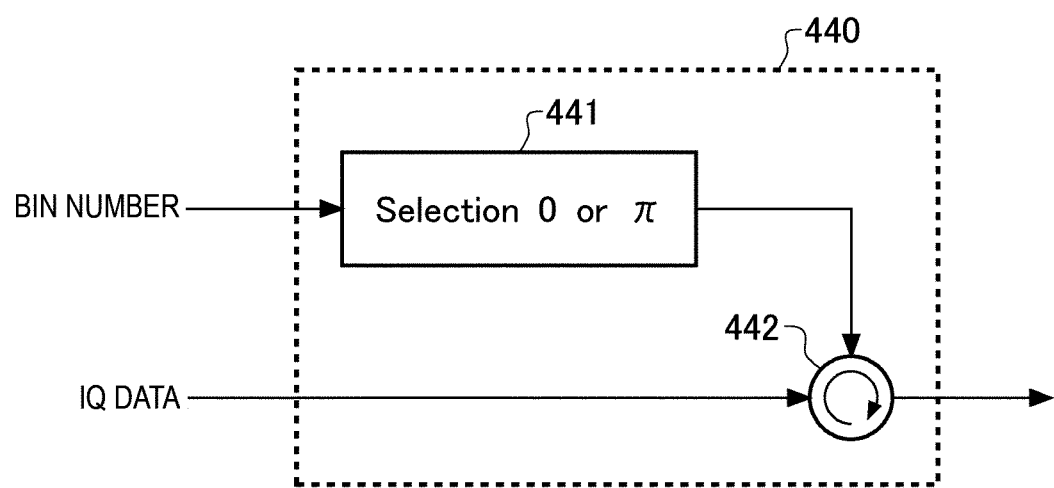
FIG. 5D is an example of a phase correction algorithm of a correction unit 440.

FIG. 5D illustrates an example of the phase correction algorithm of the correction unit 440. The correction unit 440 includes a phase selection unit 441 and a rotation unit 442.

The phase selection unit 441 selects a phase 0 or n on the basis of the bin number of the peak bin of the distance power spectrum. In an example, the phase selection unit 441 selects 0 when the bin number is an odd number, and selects n when the bin number is an even number. In addition, the phase selection unit 441 may select n when the bin number is an odd number, and may select 0 when the bin number is an even number.

The rotation unit 442 rotates the phase of the IQ data with the phase selected by the phase selection unit 441. As a result, the correction unit 440 can correct the phase of the peak bin according to the change in the bin number of the peak bin.

Figure 5E:
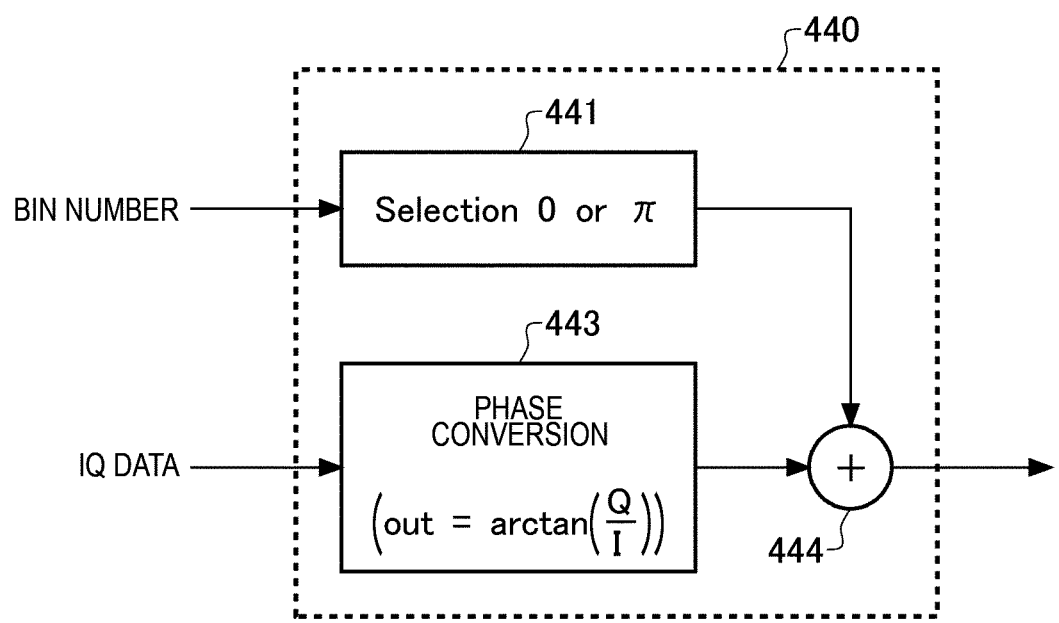
FIG. 5E is a modification of the phase correction algorithm of the correction unit 440.

FIG. 5E illustrates a modification of the phase correction algorithm of the correction unit 440. The correction unit 440 includes the phase selection unit 441, a phase conversion unit 443, and an addition/subtraction unit 444. The correction unit 440 of the present example corrects the phase of the peak bin with a phase having a magnitude corresponding to whether the bin number is an odd number or an even number.

The phase conversion unit 443 converts the IQ data into phase data. The phase conversion unit 443 of the present example calculates $\tan^{-1}(Q/1)$ from the IQ data to convert the IQ data into the phase data.

The addition/subtraction unit 444 adds or subtracts 0 or n to or from the phase data converted by the phase conversion unit 443 on the basis of the bin number acquired by the acquisition unit 420. In an example, the phase selection unit 441 selects 0 when the bin number is an odd number, and selects n when the bin number is an even number. In addition, the phase selection unit 441 may select n when the bin number is an odd number, and may select 0 when the bin number is an even number.

The data processing unit 410 may apply a higher-order window function than the rectangular window to the reception signal. The correction unit 440 may correct the phase of the output signal such that a difference between the phase to be added to or subtracted from in the odd bin number and the phase to be added to or subtracted from in the even bin number becomes $(2 \times i+1)\pi$[rad]. i may be any integer.

Here, by applying a higher-order window function to the reception signal, the phase may be inverted by 7E between the odd bin and the even bin. Therefore, since the correction unit 440 determines a correction value such that a difference between the correction factor of the odd bin and the correction factor of the even bin is $(2 \times i+1)\pi$[rad], it is not necessary to calculate the correction value each time, and the correction calculation processing can be simplified. As a result, the information processing apparatus 500 can easily specify the position of the bin and can easily correct the phase and maintain the continuity of the phase even when the peak bin is shifted to an adjacent bin.

Figure 6A:
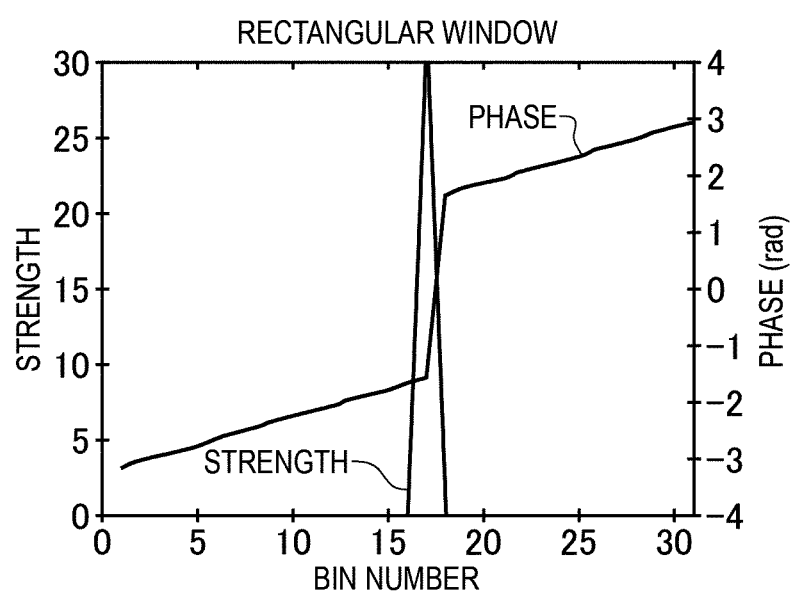
FIG. 6A illustrates an example of a relationship between a signal strength and a phase for a bin number.

FIG. 6A illustrates an example of a relationship between a signal strength and a phase with respect to the bin number. The data processing unit 410 of the present example uses a rectangular window as a window function. A phase shift 7E occurs in the bin number corresponding to a strength peak. The behavior of the phase change in the vicinity of the strength peak also changes depending on the window function used. When the rectangular window is used as the window function, one time of phase shift occurs in the vicinity of the strength peak.

Figure 6B:
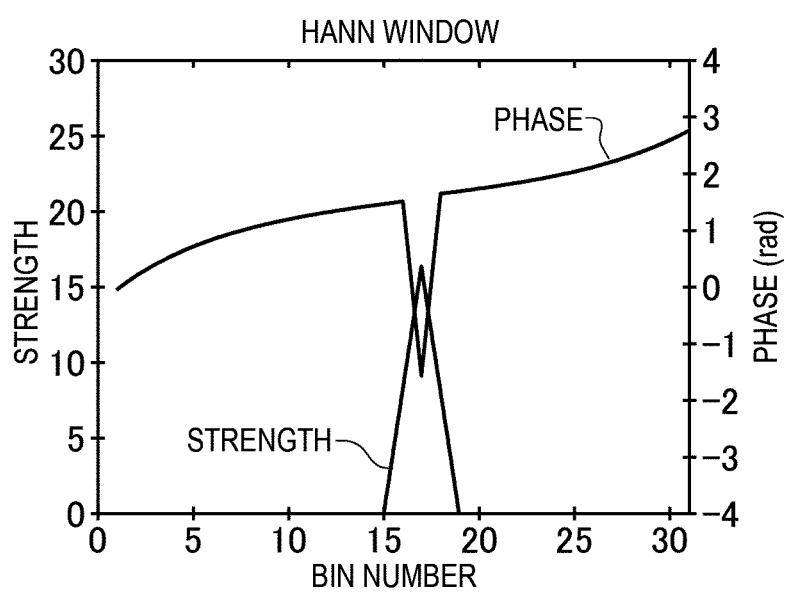
FIG. 6B illustrates an example of the relationship between the signal strength and the phase for the bin number.

FIG. 6B illustrates an example of the relationship between the signal strength and the phase with respect to the bin number. The data processing unit 410 in the present example uses the Hann window as the window function. In the present example, more phase shifts occur compared with a case where the rectangular window is used. When the Hann window is used as the window function, multiple times of phase shifts occur in the vicinity of the strength peak.

Figure 6C:
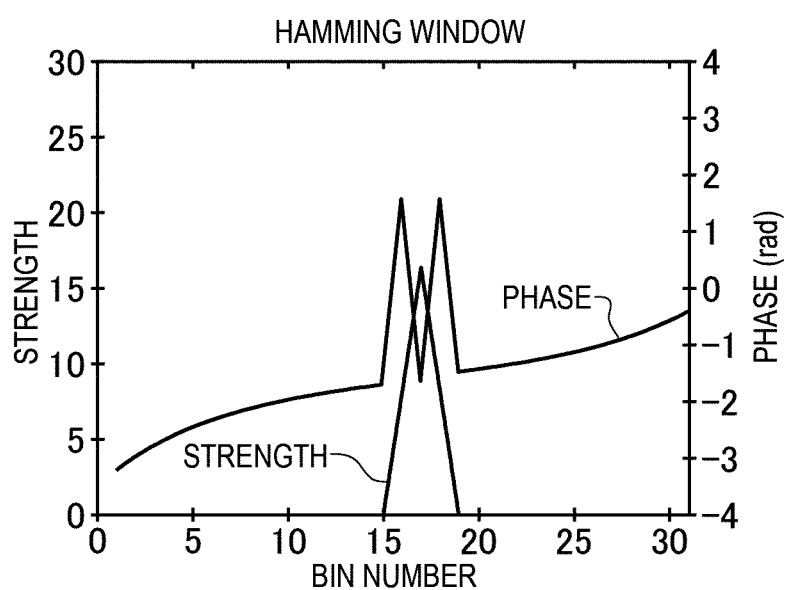
FIG. 6C illustrates an example of the relationship between the signal strength and the phase for the bin number.

FIG. 6C illustrates an example of the relationship between the signal strength and the phase with respect to the bin number. The data processing unit 410 in the present example uses the Hamming window as the window function. When the Hamming window is used as the window function, multiple times of phase shifts occur in the vicinity of the strength peak. In the present example, more phase shifts occur compared with a case where the Hann window is used.

Figure 6D:
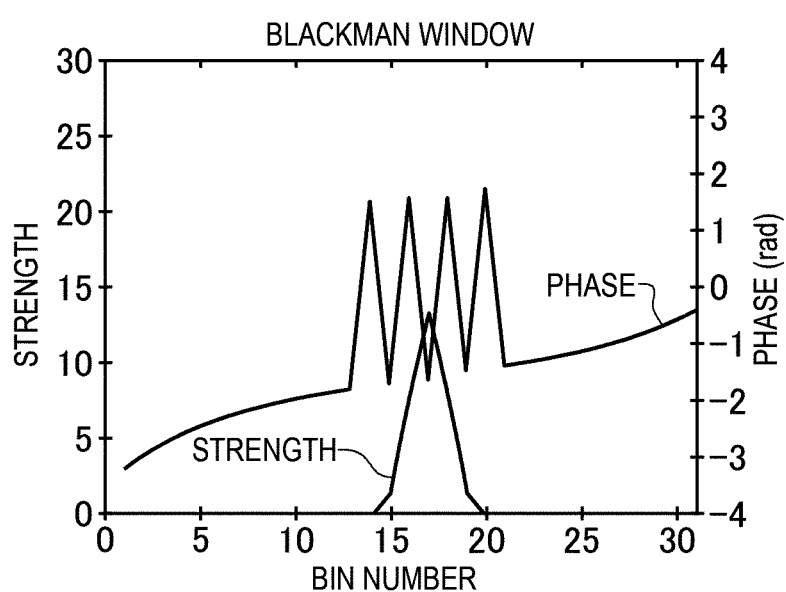
FIG. 6D illustrates an example of the relationship between the signal strength and the phase for the bin number.

FIG. 6D illustrates an example of the relationship between the signal strength and the phase with respect to the bin number. The data processing unit 410 in the present example uses the Blackman window as the window function. When the Blackman window is used as the window function, multiple times of phase shifts occur in the vicinity of the strength peak. In the present example, more phase shifts occur compared with a case where the Hamming window is used.

As described above, in the window function other than the rectangular window, more phase shifts occur than in the rectangular window. In addition, when the order of the window function increases, more phase shifts occur. The direction of the change in the phase shift is determined according to the bin numbers before and after the change. Note that the data processing unit 410 may use any window function other than the rectangular window, the Hann window, the Hamming window, and the Blackman window.

By using a higher-order window function than the rectangular window, the information processing apparatus 500 can easily specify the position of the bin in which the object 210 exists even when the object 210 moves. When a plurality of objects 210 exist, an optimal window function may be appropriately selected according to the distance between the objects.

Figure 7A:
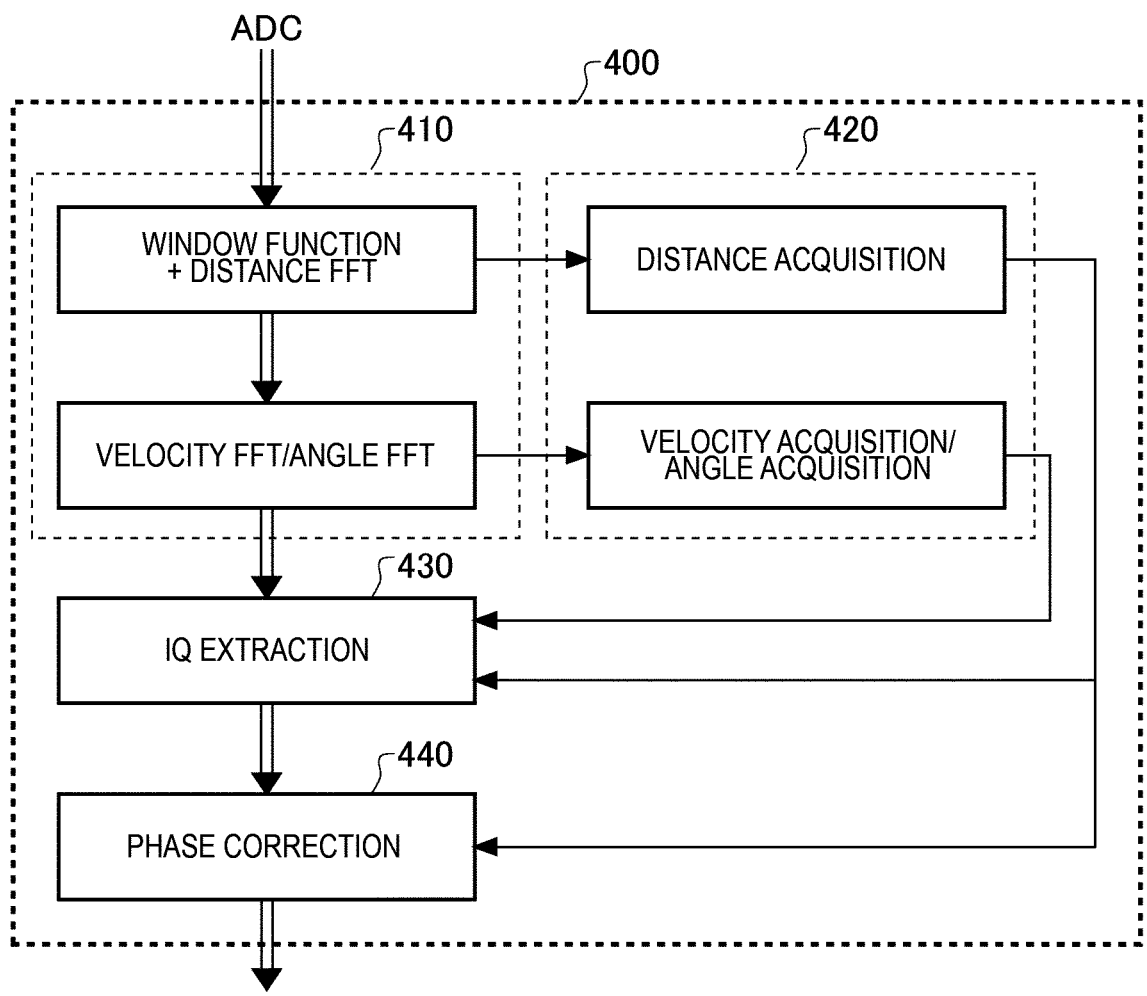
FIG. 7A illustrates a modification of the signal processing unit 400.

FIG. 7A illustrates a modification of the signal processing unit 400. In the present example, points different from the example of FIG. 5B will be particularly described. The other points may be the same as those in FIG. 5B. The data processing unit 410 of the present example executes each of the velocity FFT and the angle FFT in addition to the distance FFT.

The data processing unit 410 acquires a velocity power spectrum by executing the velocity FFT on the reception signal. In addition, the data processing unit 410 acquires an angle power spectrum by executing the angle FFT on the reception signal. After executing the distance FFT, the data processing unit 410 of the present example executes the velocity FFT and the angle FFT on the basis of the data string corresponding to the peak bin position specified by the distance FFT.

The acquisition unit 420 acquires a peak bin regarding the velocity V and the angle θ in addition to the distance R of the object 210. The acquisition unit 420 acquires a peak bin indicating the velocity V of the object 210 on the basis of the velocity power spectrum. The acquisition unit 420 of the present example acquires the peak bin of the velocity FFT on the basis of the data string corresponding to the peak bin position specified by the distance FFT. As a result, the velocity V of any object 210 selected according to the distance R can be acquired.

The acquisition unit 420 acquires a peak bin indicating the angle θ with respect to the object 210 on the basis of the angle power spectrum. The acquisition unit 420 of the present example acquires the peak bin of the angle FFT on the basis of the data string corresponding to the peak bin position specified by the distance FFT. As a result, the angle θ of any object 210 selected according to the distance R can be acquired.

The extraction unit 430 extracts each IQ data on the basis of the peak bin indicating the distance R, the velocity V, and the angle θ of the object 210. The extraction unit 430 of the present example extracts the IQ data from the velocity V and the angle θ of the bin corresponding to the peak bin of the distance R of the object 210. The extraction unit 430 may directly extract the IQ data or may extract the IQ data by using another algorithm such as compressive sensing.

The correction unit 440 executes the phase correction algorithm on the basis of IQ data extracted from at least one of the distance R, the velocity V, or the angle θ extracted by the extraction unit 430. For example, the correction unit 440 corrects the phase of each output signal of the distance R, the velocity V, and the angle θ on the basis of the IQ data extracted from the distance R, the velocity V, and the angle θ of the object 210.

The information processing apparatus 500 of the present example can output the output signal of which the phase has been corrected for each of the distance R, the velocity V, and the angle θ. The information processing apparatus 500 may correct only the phase of the output signal of any one of the distance R, the velocity V, or the angle θ.

Figure 7B:
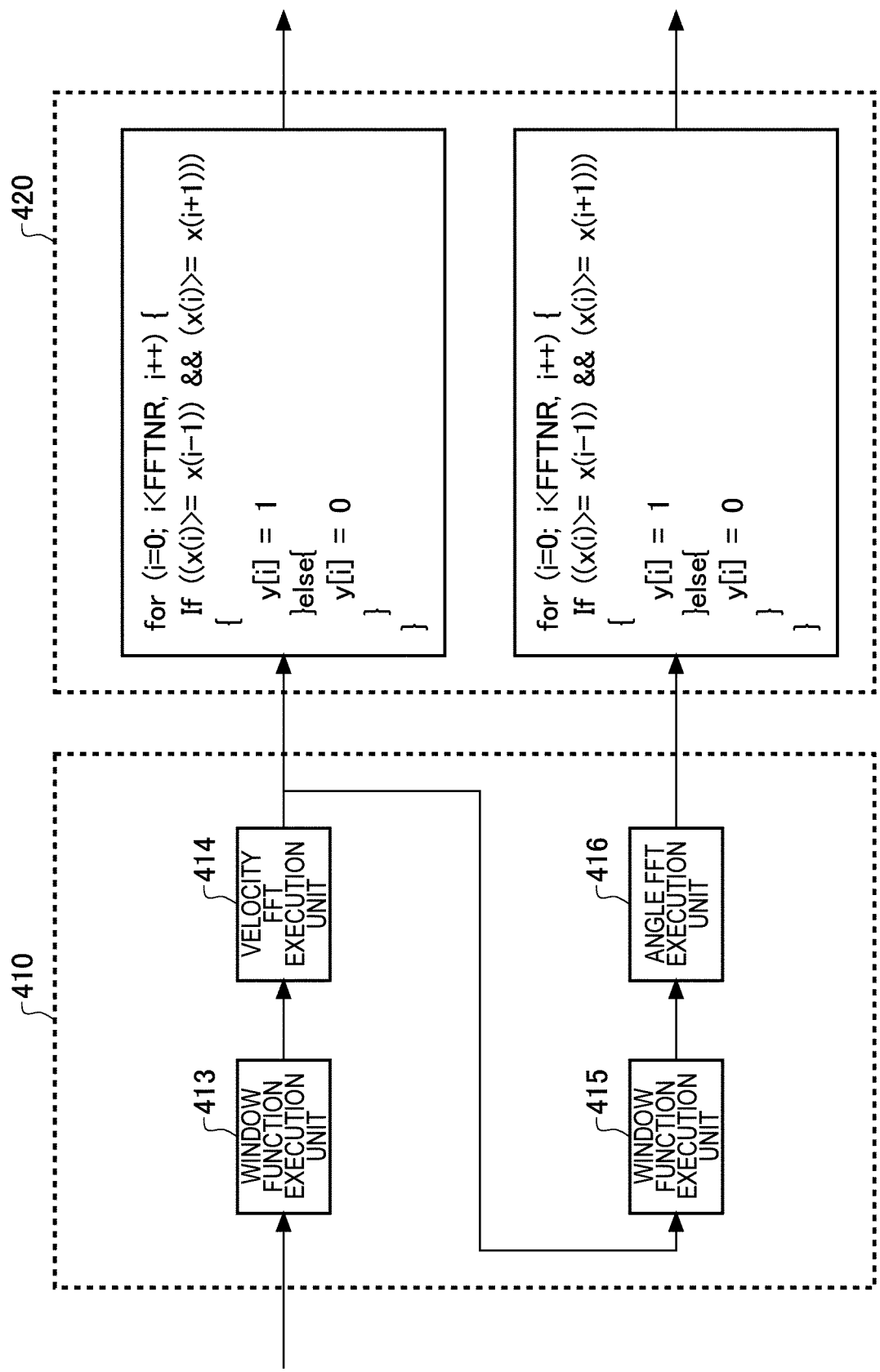
FIG. 7B is a diagram for explaining a more detailed configuration of the data processing unit 410 and the acquisition unit 420.

FIG. 7B is a diagram for explaining a more detailed configuration of the data processing unit 410 and the acquisition unit 420. In the present example, processing regarding the velocity FFT and the angle FFT will be described. The data processing unit 410 of the present example includes a window function execution unit 413, a velocity FFT execution unit 414, a window function execution unit 415, and an angle FFT execution unit 416.

The window function execution unit 413 executes a predetermined window function in order to cut out the input signal. The velocity FFT execution unit 414 executes the velocity FFT processing on the signal cut out by the window function execution unit 413 to convert the signal into a velocity power spectrum in a frequency domain.

In the present example, after the window function execution unit 413 cuts out the digital reception signal, the velocity FFT execution unit 414 performs the conversion into the velocity power spectrum in the frequency domain by the velocity FFT. However, the order of the FFT processing and the window function processing is not limited thereto. The window function execution unit 413 may cut out the signal after the velocity FFT execution unit 414 performs the conversion into the velocity power spectrum. Other algorithms such as CAPON method or compressive sensing may be used for the spectrum conversion.

The window function execution unit 415 executes a predetermined window function in order to cut out the signal input from the velocity FFT execution unit 414. The angle FFT execution unit 416 executes the angle FFT processing on the signal cut out by the window function execution unit 415 to convert the signal into an angle power spectrum in a frequency domain. The window function execution unit 415 may use the same window function as that of the window function execution unit 413 or may use a different window function.

In the present example, after the window function execution unit 415 cuts out the digital reception signal, the angle FFT execution unit 416 performs the conversion into the angle power spectrum in the frequency domain by the angle FFT. However, the order of the FFT processing and the window function processing is not limited thereto. The window function execution unit 415 may cut out the signal after the angle FFT execution unit 416 performs the conversion into the angle power spectrum. Other algorithms such as CAPON method or compressive sensing may be used for the spectrum conversion.

The acquisition unit 420 detects the peak position indicating the velocity V or the angle θ of the object 210 from the power spectrum signal of the frequency domain output from the velocity FFT execution unit 414 and the angle FFT execution unit 416 by using a predetermined detection algorithm. The acquisition unit 420 may acquire the peak position by a simple peak detection algorithm, or may acquire the peak position by using another algorithm such as the CFAR algorithm. The acquisition unit 420 outputs the acquired peak bin of the velocity V and the angle θ of the object 210 to the extraction unit 430 and the correction unit 440.

Figure 8A:
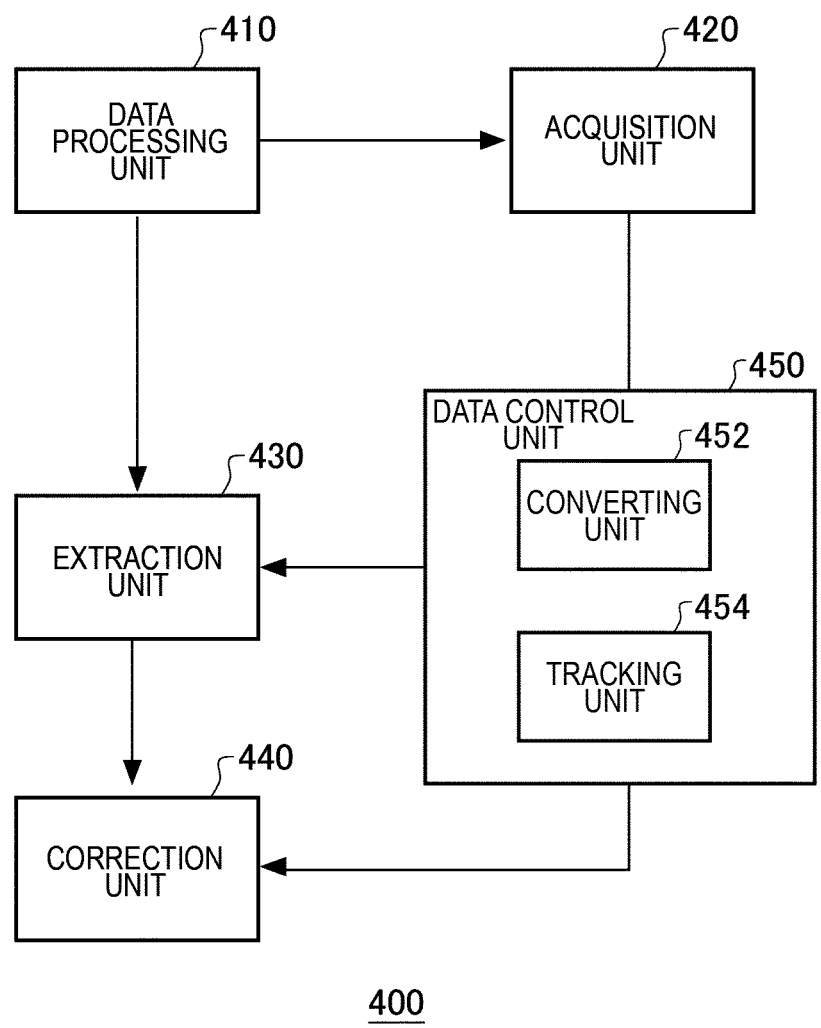
FIG. 8A illustrates a modification of the signal processing unit 400.

FIG. 8A illustrates a modification of the signal processing unit 400. In the present example, points different from the example of FIG. 7A will be particularly described. The other points may be the same as those in FIG. 7A. The signal processing unit 400 of the present example includes a data control unit 450. The data control unit 450 includes a data converting unit 452 and a tracking unit 454.

The data converting unit 452 converts a plurality of pieces of data corresponding to the object 210 acquired by the acquisition unit 420 into clustered data. For example, when a plurality of detection points that may belong to the same object 210 are generated, the data converting unit 452 replaces the plurality of detection points corresponding to the target object 210 with one detection point. As a result, the information processing apparatus 500 can cluster the group corresponding to the same object 210 into one detection point and simplify the processing.

When the data corresponding to the object 210 cannot be obtained in a predetermined period, the tracking unit 454 tracks the object 210 on the basis of past data of the object 210. Even when the object 210 cannot be detected by the processing within the predetermined time and the data is missing in the detection of the vibration of the object 210, the tracking unit 454 can complement the data of the object 210 by using the tracking algorithm. As a result, the information processing apparatus 500 can predict the position of the object 210 even when there is no measurement data within the predetermined time.

In the present example, since the data clustered by the data control unit 450 is output to the extraction unit 430 and the correction unit 440, the processing in the extraction unit 430 and the correction unit 440 can be simplified. In addition, since the data tracked by the data control unit 450 is output to the extraction unit 430 and the correction unit 440, missing of data can be avoided also in the extraction unit 430 and the correction unit 440.

Figure 8B:
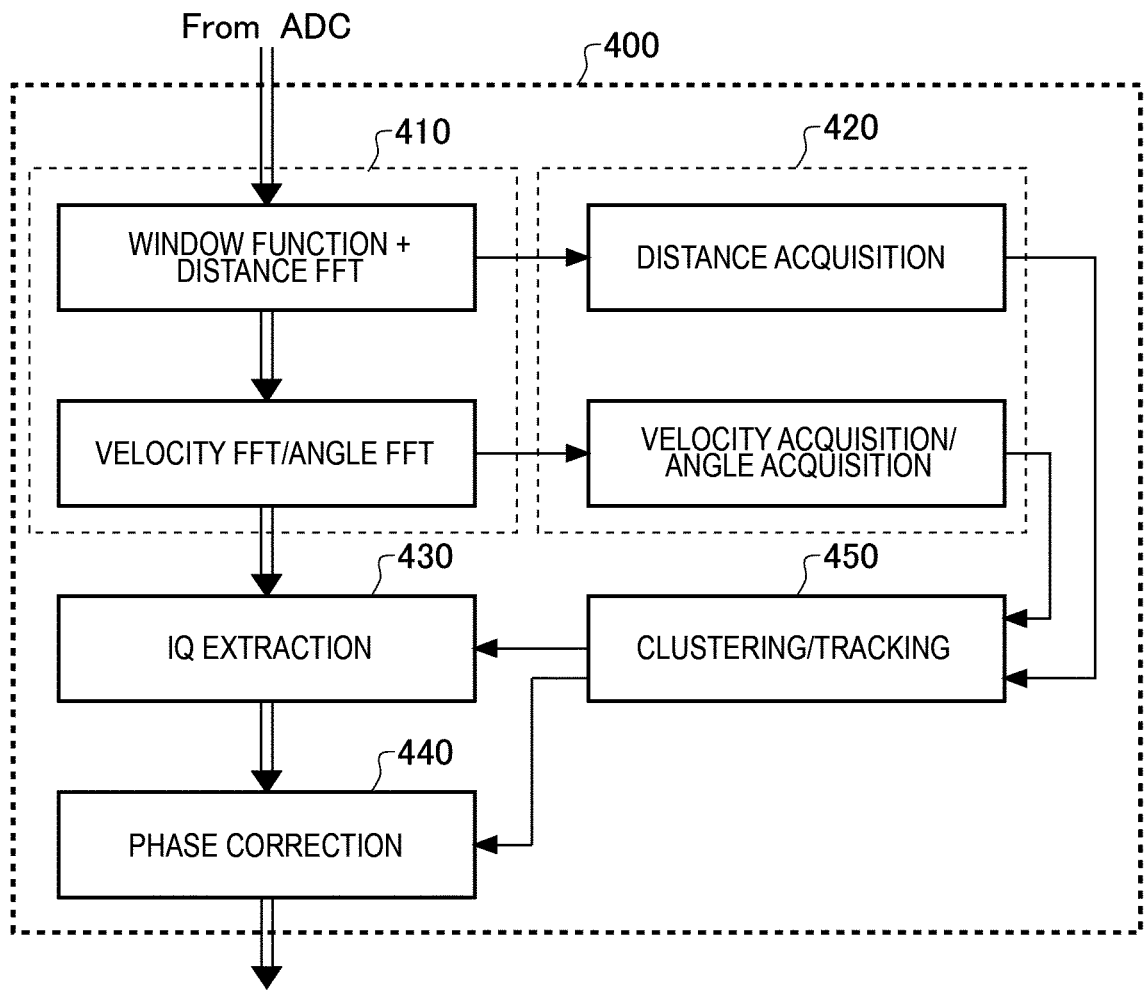
FIG. 8B illustrates an example of an operation of the signal processing unit 400.

FIG. 8B illustrates an example of the operation of the signal processing unit 400. The data control unit 450 may execute clustering processing or tracking processing on the detection point corresponding to at least one of the distance R, the velocity V, or the angle θ of the object 210. The data control unit 450 outputs each of the processed data to the extraction unit 430 and the correction unit 440.

Figure 8C:
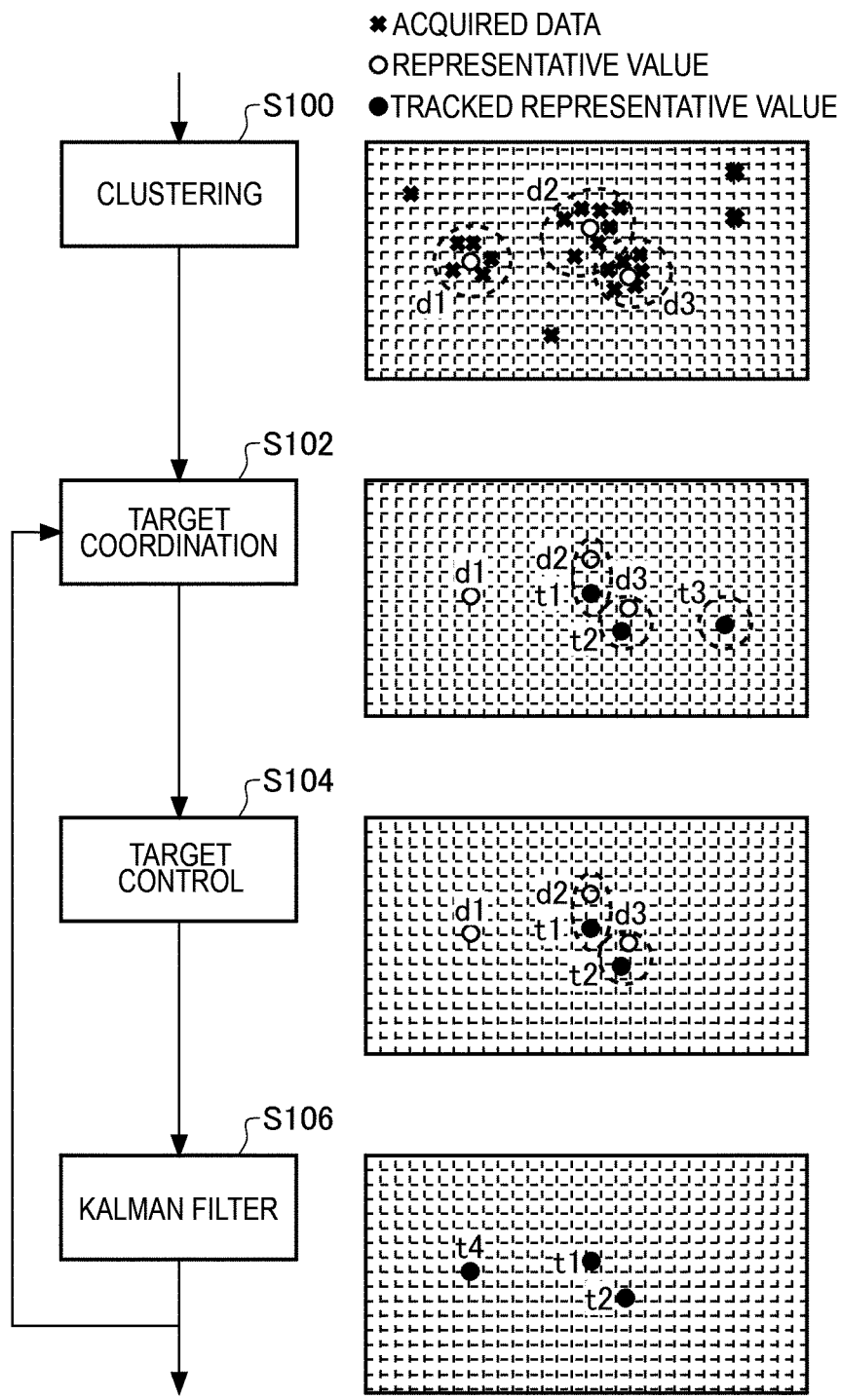
FIG. 8C illustrates an example of a data conversion by a data control unit 450.

FIG. 8C illustrates an example of the data conversion by the data control unit 450. The data conversion method of the present example is an example, and the present invention is not limited thereto.

In step S100, the data control unit 450 clusters the acquired data acquired by the acquisition unit 420. For example, the acquired data is clustered into each cluster according to the distribution of the acquired data. The data control unit 450 of the present example performs clustering into three clusters. The data control unit 450 sets representative values d1 to d3 representing respective clusters. The representative value may be a value near the center of the distribution of the cluster.

In step S102, a calculated representative value is associated with past tracked representative values t1 to t3, and a pair of a new representative value and a past representative value is formed. In the present example, a representative value d2 is associated with the past representative value t1, and a representative value d3 is associated with the past representative value t2.

In step S104, the data control unit 450 manages a target and links a correct ID to the associated data.

The corresponding representative value does not exist for the representative value d1, and thus a new ID is assigned as the new object 210. The representative values d2 and d3 are associated with the ID corresponding to the object 210 since the tracked past representative values t1 and t2 exist for the representative values d2 and d3, respectively. The past representative value t3 is removed since there is no representative value corresponding to the current representative value.

In step S106, filtering is performed by a Kalman filter. In the present example, newly tracked representative values t1, t2, and t4 exist. The representative values t1 and t2 continue to exist as tracked representative values. The representative value t4 is tracked as a new representative value based on the representative value d1. The tracked representative values t1, t2, and t4 may be used for the target coordination in step S102.

An adjacent bin may be selected according to the detection algorithm or the tracking algorithm. Even when an adjacent bin is selected and a phase shift occurs, the information processing apparatus 500 can compensate for the phase shift of the output signal.

Figure 9:
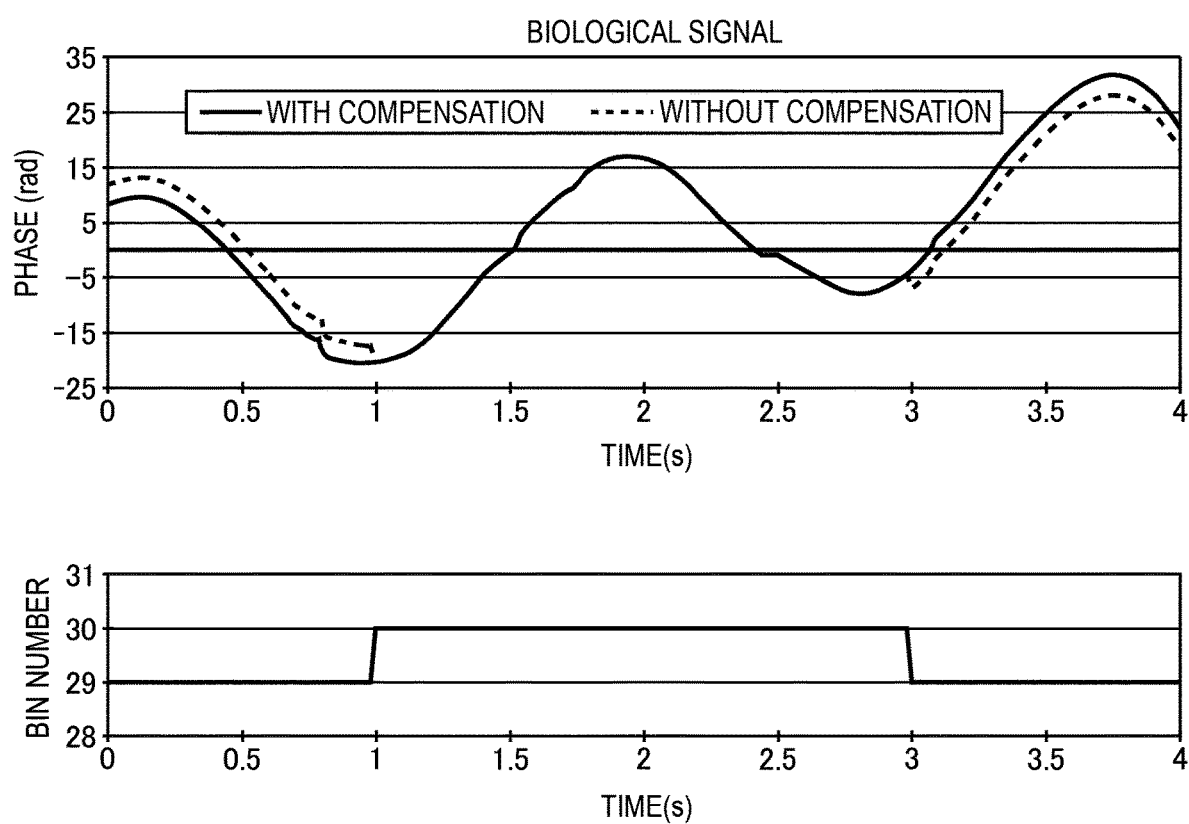
FIG. 9 illustrates an example of a phase compensation result by the information processing apparatus 500.

FIG. 9 illustrates an example of the phase compensation result by the information processing apparatus 500. By compensating for the phase, the information processing apparatus 500 can remove the discontinuity of the phase as compared with a case where there is no phase compensation. The correction unit 440 of the present example corrects the phase of the peak bin of the bin number 30 without correcting the phase of the peak bin of the bin number 29. Note that the bin number for phase correction is not limited thereto. The bin number 29 is an example of a first bin number not to be subject to the phase correction. The bin number 30 is an example of a second bin number to be subject to the phase correction.

The information processing apparatus 500 compensates for the phase shift accompanying the movement of the object 210, and can more accurately sense the object 210 according to the lapse of time. The information processing apparatus 500 can detect a small body motion of the object 210 in a non-contact manner, and thus can be used in various fields. The information processing apparatus 500 can be applied to a medical field in which a biological signal such as the heartbeat or breathing is detected. In addition, the information processing apparatus 500 may be used to sense vibration of a structure such as a building or a bridge and sense a defect, or may be used to sense vibration of a motor or the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

38: data cube, 100: transceiving unit, 120: transmitter, 140: receiver, 150: beat signal, 160: transceiving control unit, 210: object, 220: transmission wave, 230: reception wave, 300: input unit, 400: signal processing unit, 410: data processing unit, 411: window function execution unit, 412: distance FFT execution unit, 413: window function execution unit, 414: velocity FFT execution unit, 415: window function execution unit, 416: angle FFT execution unit, 420: acquisition unit, 430: extraction unit, 440: correction unit, 441: phase selection unit, 442: rotation unit, 443: phase conversion unit, 444: addition/subtraction unit, 450: data control unit, 452: data converting unit, 454: tracking unit, 500: information processing apparatus, 600: system

What is claimed is:

1. An information processing apparatus configured to sense an object by using an FMCW radar, the information processing apparatus comprising:
a data processing unit configured to process a reception signal based on a reception wave of the FMCW radar and generate a power spectrum signal with a predetermined number of bins;
an acquisition unit configured to acquire a plurality of peak bins corresponding to the object on a basis of the power spectrum signal;
an extraction unit configured to extract an output signal corresponding to the power spectrum signal; and
a correction unit configured to correct a phase of the output signal according to bin numbers of the plurality of peak bins, wherein
the data processing unit is configured to apply a higher-order window function than a rectangular window to the reception signal,
the correction unit is configured to correct a phase of the output signal such that a difference between a phase to be added to or subtracted from a phase extracted from an odd-numbered peak bin among the plurality of peak bins and a phase to be added to or subtracted from a phase extracted from an even-numbered peak bin among the plurality of peak bins becomes $(2 \times +1)\pi$ rad, and
i is any integer.

2. The information processing apparatus according to claim 1, wherein
the plurality of peak bins includes a peak bin of a predetermined first bin number and a peak bin of a second bin number different from the first bin number, and
the correction unit is configured to correct a phase of the peak bin of the second bin number without correcting a phase of the peak bin of the first bin number.

3. The information processing apparatus according to claim 2, wherein
the data processing unit is configured to acquire a distance power spectrum regarding a distance to the object by executing a distance FFT on the reception signal, and
the acquisition unit is configured to acquire a peak bin indicating the distance to the object on a basis of the distance power spectrum.

4. The information processing apparatus according to claim 2, wherein
the data processing unit is configured to acquire a velocity power spectrum regarding a velocity with respect to the object by executing a velocity FFT on the reception signal, and
the acquisition unit is configured to acquire a peak bin indicating the velocity with respect to the object on a basis of the velocity power spectrum.

5. The information processing apparatus according to claim 2, wherein
the data processing unit is configured to acquire an angle power spectrum regarding an angle with respect to the object by executing an angle FFT on the reception signal, and
the acquisition unit is configured to acquire a peak bin indicating the angle with respect to the object on a basis of the angle power spectrum.

6. The information processing apparatus according to claim 2, comprising:
a data converting unit configured to convert a plurality of pieces of data corresponding to the object into clustered data.

7. The information processing apparatus according to claim 2, comprising:
a tracking unit configured to track the object on a basis of past data of the object when data corresponding to the object is not obtainable in a predetermined period.

8. The information processing apparatus according to claim 2, wherein
the extraction unit is configured to extract IQ data including an in-phase component and a quadrature component orthogonal to the in-phase component from a peak bin acquired by the acquisition unit.

9. The information processing apparatus according to claim 2, wherein
the data processing unit is configured to process the reception signal by using a CAPON method or a compressive sensing algorithm.

10. The information processing apparatus according to claim 1, wherein
the data processing unit is configured to acquire a distance power spectrum regarding a distance to the object by executing a distance FFT on the reception signal, and the acquisition unit is configured to acquire a peak bin indicating the distance to the object on a basis of the distance power spectrum.

11. The information processing apparatus according to claim 10, wherein
the correction unit corrects a phase of a peak bin of the distance power spectrum.

12. The information processing apparatus according to claim 1, wherein
the data processing unit is configured to acquire a velocity power spectrum regarding a velocity with respect to the object by executing a velocity FFT on the reception signal, and
the acquisition unit is configured to acquire a peak bin indicating the velocity with respect to the object on a basis of the velocity power spectrum.

13. The information processing apparatus according to claim 12, wherein
the acquisition unit is configured to acquire a peak bin of the velocity FFT on a basis of a data string corresponding to a peak bin position specified by a distance FFT.

14. The information processing apparatus according to claim 1, wherein
the data processing unit is configured to acquire an angle power spectrum regarding an angle with respect to the object by executing an angle FFT on the reception signal, and
the acquisition unit is configured to acquire a peak bin indicating the angle with respect to the object on a basis of the angle power spectrum.

15. The information processing apparatus according to claim 14, wherein
the acquisition unit is configured to acquire a peak bin of the angle FFT on a basis of a data string corresponding to a peak bin position specified by a distance FFT.

16. The information processing apparatus according to claim 1, comprising:
a data converting unit configured to convert a plurality of pieces of data corresponding to the object into clustered data.

17. The information processing apparatus according to claim 1, comprising:
a tracking unit configured to track the object on a basis of past data of the object when data corresponding to the object is not obtainable in a predetermined period.

18. The information processing apparatus according to claim 1, wherein
the extraction unit is configured to extract IQ data including an in-phase component and a quadrature component orthogonal to the in-phase component from a peak bin acquired by the acquisition unit.

19. The information processing apparatus according to claim 1, wherein
the data processing unit is configured to process the reception signal by using a CAPON method or a compressive sensing algorithm.

20. A sensing method for sensing an object by using an FMCW radar, the sensing method comprising:
processing a reception signal based on a reception wave of the FMCW radar and generating a power spectrum signal with a predetermined number of bins;
acquiring a plurality of peak bins corresponding to the object on a basis of the power spectrum signal;
extracting an output signal corresponding to the power spectrum signal; and
correcting a phase of the output signal according to bin numbers of the plurality of peak bins, wherein
the generating the power spectrum signal includes applying a higher-order window function than a rectangular window to the reception signal,
the correcting includes correcting the phase of the output signal such that a difference between a phase to be added to or subtracted from a phase extracted from an odd-numbered peak bin among the plurality of peak bins and a phase to be added to or subtracted from a phase extracted from an even-numbered peak bin among the plurality of peak bins becomes $(2\times+1)\pi$ rad, and
i is any integer.

* * * * *